US009633443B2

(12) United States Patent
Okamura et al.

(10) Patent No.: US 9,633,443 B2
(45) Date of Patent: Apr. 25, 2017

(54) IMAGE PROCESSING DEVICE, IMAGE PROCESSING METHOD, AND PROGRAM FOR CUTTING OUT A CUT-OUT IMAGE FROM AN INPUT IMAGE

(71) Applicant: SONY CORPORATION, Tokyo (JP)

(72) Inventors: Yuki Okamura, Saitama (JP); Takaomi Kimura, Tokyo (JP); Daisuke Mochizuki, Chiba (JP)

(73) Assignee: Sony Corporation, Tokyo (JP)

( * ) Notice: Subject to any disclaimer, the term of this patent is extended or adjusted under 35 U.S.C. 154(b) by 293 days.

(21) Appl. No.: 13/859,158

(22) Filed: Apr. 9, 2013

(65) Prior Publication Data
US 2013/0328918 A1 Dec. 12, 2013

(30) Foreign Application Priority Data

Jun. 6, 2012 (JP) ................................ 2012-128768

(51) Int. Cl.
*G06T 7/00* (2006.01)
*G06T 3/00* (2006.01)

(52) U.S. Cl.
CPC .......... *G06T 7/0079* (2013.01); *G06T 3/0093* (2013.01); *G06T 2207/20132* (2013.01)

(58) Field of Classification Search
CPC .................... G06T 2207/20132; G06T 3/0093
See application file for complete search history.

(56) References Cited

U.S. PATENT DOCUMENTS

| 2003/0058254 | A1* | 3/2003 | Dworsky | ................. G06T 11/60 345/619 |
| 2003/0080974 | A1* | 5/2003 | Grosvenor | ......... G06K 9/00228 345/622 |
| 2010/0053364 | A1* | 3/2010 | Mino | ................. H04N 5/23212 348/222.1 |
| 2011/0069085 | A1* | 3/2011 | Weber | ..................... G06T 11/60 345/620 |
| 2011/0157423 | A1* | 6/2011 | Ando et al. | ................ 348/231.6 |
| 2012/0086723 | A1* | 4/2012 | Fairfield | .................. G09G 5/36 345/620 |

(Continued)

FOREIGN PATENT DOCUMENTS

GB 2372658 A * 8/2002
JP 2005-303908 10/2005

(Continued)

OTHER PUBLICATIONS

Dictionary definition of "incline" in Oxford Dictionary (American English) (US), Oxford University Press, downloaded on Sep. 7, 2016 from http://www.oxforddictionaries.com/us/definition/american_english/incline, 13 pages.*

(Continued)

*Primary Examiner* — Jeffery A Brier
(74) *Attorney, Agent, or Firm* — Paratus Law Group, PLLC

(57) ABSTRACT

There is provided an image processing device including an image generation unit that analyzes an input image, cuts out, based on an analysis result of the input image, a cut-out image from the input image, and generates cut-out image information in which the cut-out image is associated with a restrictive condition that the cut-out image satisfies.

11 Claims, 38 Drawing Sheets

(56) References Cited

U.S. PATENT DOCUMENTS

| | | | |
|---|---|---|---|
| 2012/0275643 A1* | 11/2012 | Beckford | G06Q 30/0603 |
| | | | 382/100 |
| 2013/0107018 A1* | 5/2013 | Sakurabu | 348/49 |
| 2013/0108122 A1* | 5/2013 | Ptucha | G06T 11/00 |
| | | | 382/118 |

FOREIGN PATENT DOCUMENTS

| | | |
|---|---|---|
| JP | 2007-019893 | 1/2007 |
| JP | 2010-262326 | 11/2010 |
| WO | WO 2011/148562 | 12/2011 |

OTHER PUBLICATIONS

Nov. 17, 2015, JP communication issued for related JP application No. 2012-128768.
Mar. 15, 2016, Japanese Office Action for related JP Application No. 2012-128768.
Jul. 1, 2016, Japanese Office Action for related JP application No. 2012-128768.
Sep. 1, 2016, CN communication issued for related CN application No. 201310210057.

\* cited by examiner

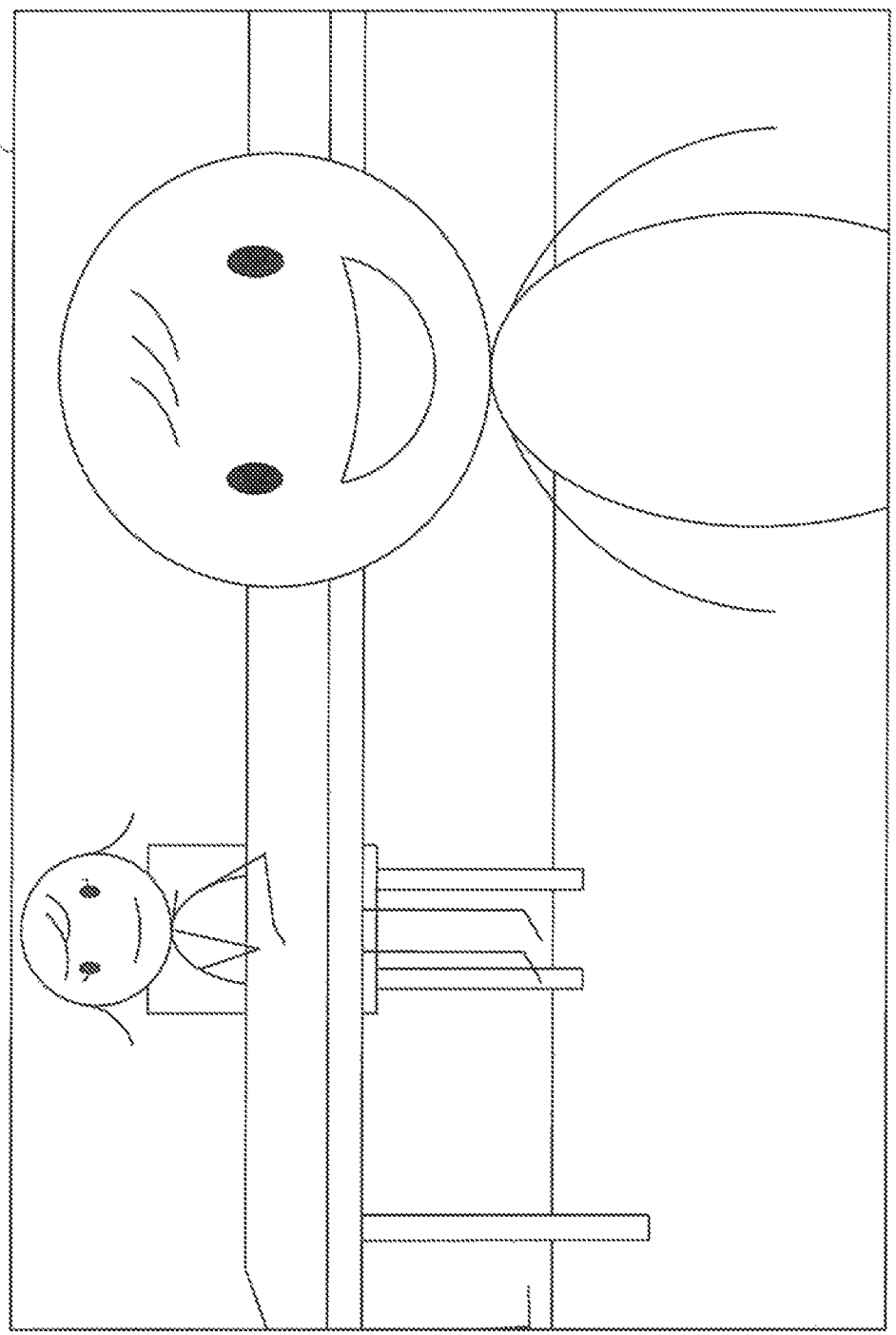

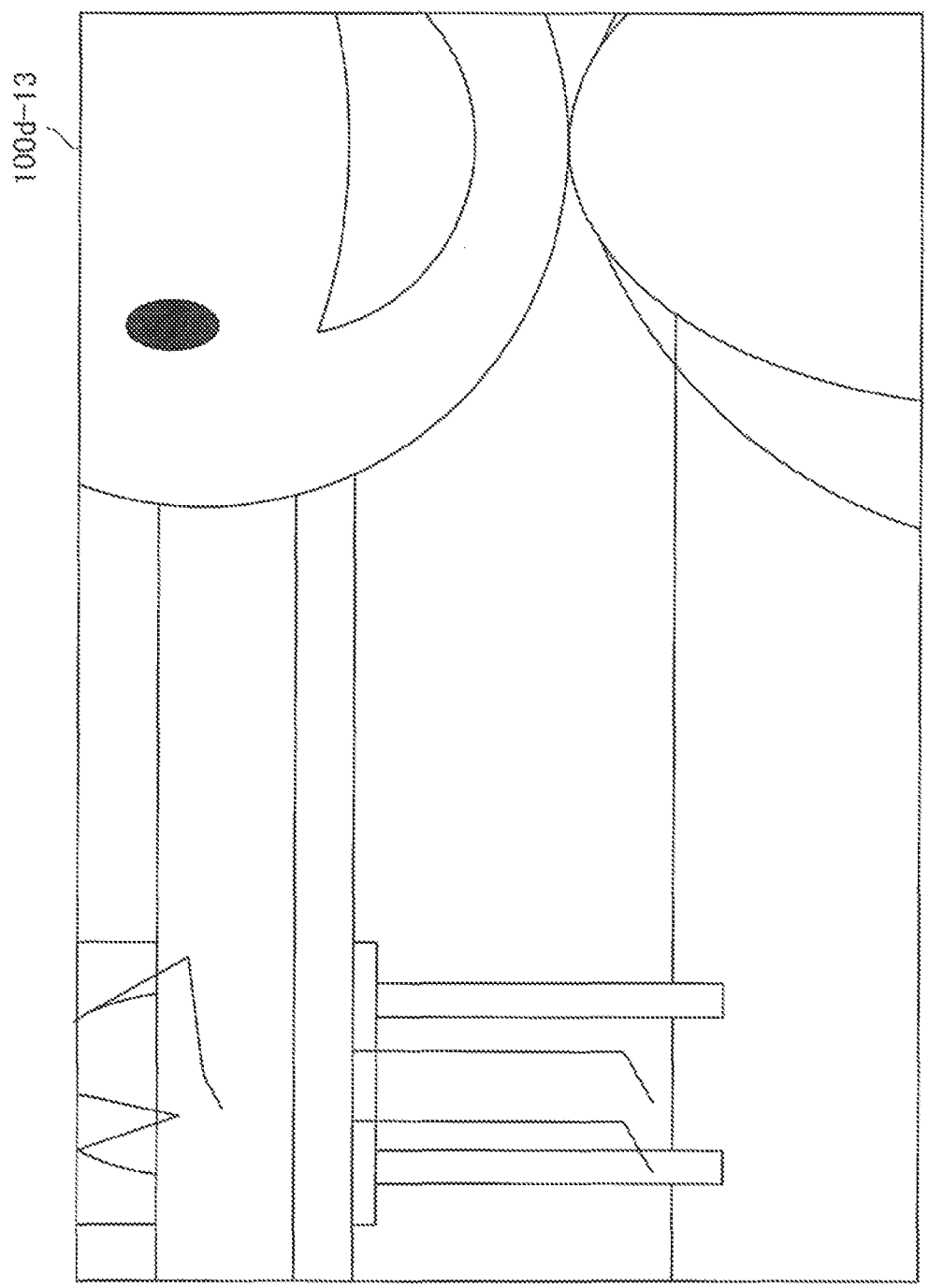

IMAGE PROCESSING DEVICE, IMAGE PROCESSING METHOD, AND PROGRAM FOR CUTTING OUT A CUT-OUT IMAGE FROM AN INPUT IMAGE

BACKGROUND

The present disclosure relates to an image processing device, an image processing method, and a program.

A technology in which an input image is analyzed, and then a plurality of cut-out images whose compositions are different from one another are generated from the input image based on an analysis result is disclosed in Japanese Unexamined Patent Application Publication No. 202.07-19893.

SUMMARY

However, since the technology disclosed in Japanese Unexamined Patent Application Publication No. 2007-19893 does not consider restrictive conditions that the cut-out images satisfy (for example, the aspect ratio, the size, the positioning in the input image, and the like) at all, the cut-out images are not effectively utilized. For this reason, a technology in which restrictive conditions that cut-out images satisfy can be set has been demanded.

According to an embodiment of the present disclosure, there is provided an image processing device including an image generation unit that analyzes an input image, cuts out, based on an analysis result of the input image, a cut-out image from the input image, and generates cut-out image information in which the cut-out image is associated with a restrictive condition that the cut-out image satisfies.

According to an embodiment of the present disclosure, there is provided an image processing method including cutting out, based on an analysis result of an input image, a cut-out image from the input image, and generating cut-out image information in which the cut-out image is associated with a restrictive condition that the cut-out image satisfies.

According to an embodiment of the present disclosure, there is provided a program for causing a computer to realize an image generation function of cutting out, based on an analysis result of an input image, a cut-out image from the input image, and generating cut-out image information in which the cut-out image is associated with a restrictive condition that the cut-out image satisfies.

According to the embodiments of the present disclosure described above, the image processing device can generate cut-out image information in which cut-out images and restrictive conditions are associated.

According to the embodiments of the present disclosure as described above, the image processing device can generate cut-out image information in which cut-out images and restrictive conditions are associated. In other words, the image processing device can set the restrictive conditions that the cut-out images satisfy.

BRIEF DESCRIPTION OF THE DRAWINGS

FIG. 40 is an illustrative diagram showing an effect image according to the related art; and FIG. 41 is an illustrative diagram showing an effect image according to the related art.

DETAILED DESCRIPTION OF THE EMBODIMENT(S)

Figure 1:
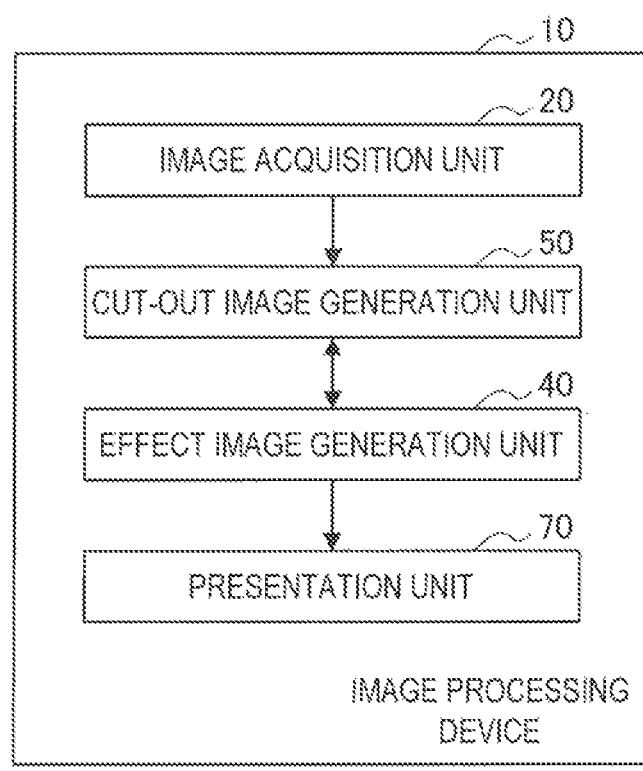
FIG. 1 is a block diagram showing a configuration of an image processing device according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.

1. First embodiment (example of generating and displaying effect image for slide show)

1-1. Review of slide show 1-2. Configuration of image processing device 1-3. Procedure of process executed by image processing device 2. Second embodiment (example of displaying enlarged subject, or the like according to input operation performed by user)

<1. First Embodiment>

[1-1. Review of Slide Show]

The present inventor keenly conducted review on slide shows, and as a result, conceived an image processing device according to the embodiment of the present disclosure. Thus, the review conducted by the present inventor will be first described. A slide show is a process in which, for example, a plurality of effect images are displayed while being switched according to the passage of time (or user operations).

The image processing device that can perform a slide show conducts the following process in general. In other words, the image processing device acquires input images from, for example, a storage location (a folder, or the like) that a user designates. On the other hand, the image processing device generates a plurality of effect reference images in which one or more of display regions (display frames) are set. Then, the image processing device generates a plurality of effect images by superimposing different input images over each of the display regions. Then, the image processing device displays the plurality of effect images while switching them according to the passage of time (or user operations).

However, there are cases in which the number of input images is smaller than the total number of display regions, in other words, input images are not enough, in the number of input images. Particularly, in recent years, technologies for displaying a slide show to music have been proposed, and in the technologies, a number of effect images corresponding to the length of the music are necessary. Thus, it is highly likely for the input images to be insufficient for the length of the music.

Figure 38:
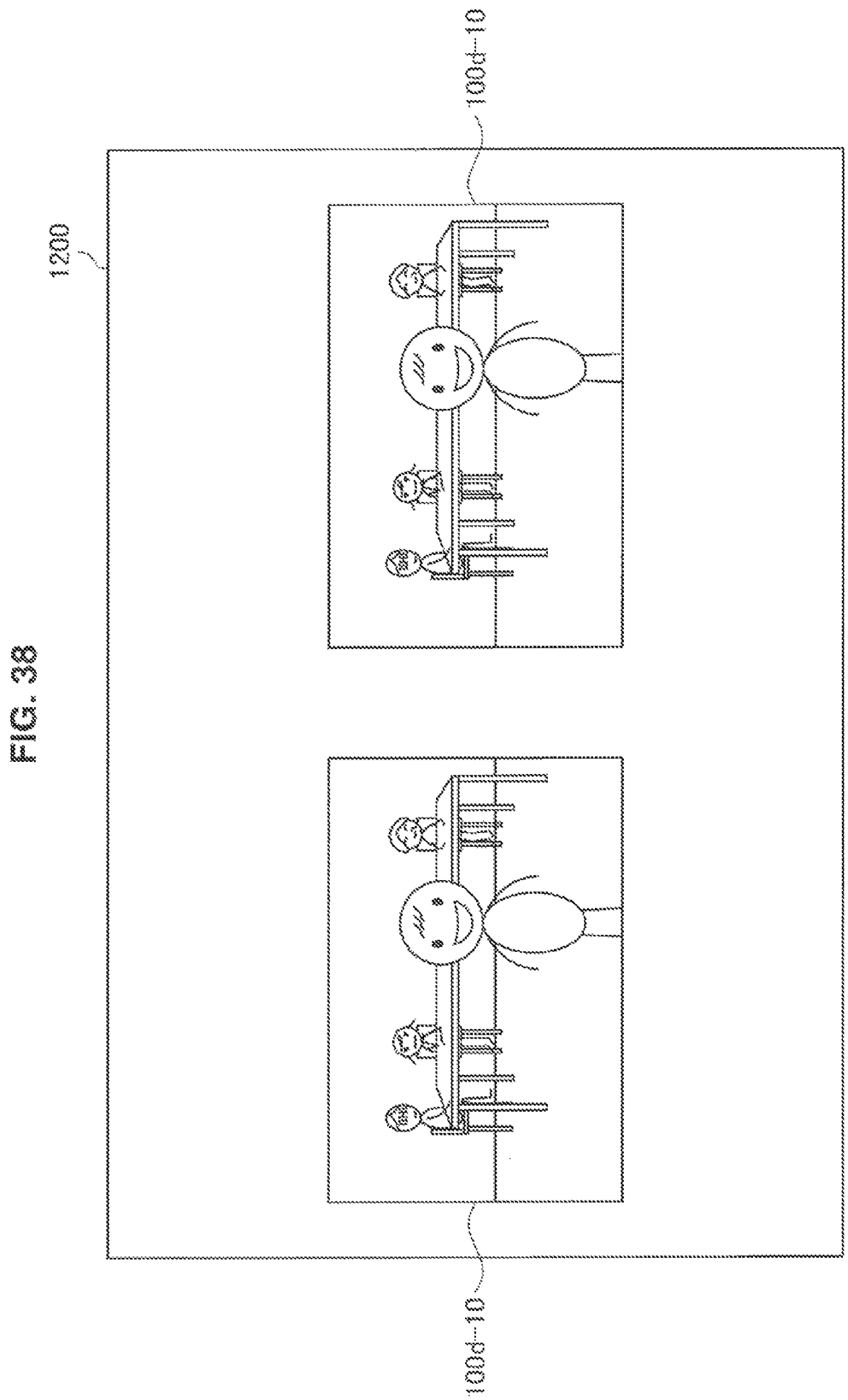
FIG. 38 is an illustrative diagram showing an effect image according to the related art.

As a countermeasure for such cases, a process of superimposing the same input image over a plurality of display regions, or reducing display regions of each effect reference image has been proposed. An effect image generated in the former process includes the same input images. An example of such an effect image is shown in FIG. 38. In this example, the same input images 100*d*-10 are included in an effect image 1200.

According to the process, the image processing device can generate a plurality of effect images even when the number of input images is fewer than the total number of display regions. However, in the process, there are cases in which the same input images are included in one effect image, as shown in, for example, FIG. 38. Such an effect image does not look attractive in comparison to an effect image that includes different input images. For this reason, even when the number of input images is fewer than the total number of display regions, a technology for generating an effect image that looks attractive has been demanded.

Thus, the present inventor focused on a technology of cutting out input images. As such a technology, for example, the technology disclosed in Japanese Unexamined Patent Application Publication No. 2007-19893 is known. In the technology disclosed in Japanese Unexamined Patent Application Publication No. 2007-19893, input images are analyzed, and then a plurality of cut-out images whose compositions are different from one another are generated from the input images based on an analysis result. Accordingly, input images are padded, and thus the possibility of input images being insufficient is lowered.

However, the technology disclosed in Japanese Unexamined Patent Application Publication No. 2007-19893 does not consider restrictive conditions that cut-out images satisfy (for example, an aspect ratio, the size, the positioning in an input image, and the like) at all. For this reason, in the image processing device, even if such cut-out images are provided, enormous effort is necessary for utilizing the cut-out images. To be specific, in the image processing device, it is necessary to superimpose cut-out images over display regions, and thus setting the display regions is necessary according to the restrictive conditions that the cut-out images satisfy. However, since the restrictive conditions that the cut-out images satisfy are not presented at all in the technology disclosed in Japanese Unexamined Patent Application Publication No. 2007-19893, even if cut-out images are provided in the image processing device, enormous effort is taken for setting display regions according to the cut-out images in the image processing device. Therefore, the image processing device is not able to effectively utilize cut-out images.

Thus, the present inventor keenly conducted review again on a technology in which restrictive conditions that cut-out images satisfy can be generated, and effect images that look attractive can thereby be generated, and thus conceived an image processing device according to the embodiment of the present disclosure. Hereinafter, the image processing device will be described.

<1-2. Configuration of Image Processing Device>

The image processing device 10 is provided with an image acquisition unit 20, an effect image generation unit 40, a cut-out image generation unit 50, and a presentation unit 70. Note that the image processing device 10 has a hardware configuration such as a CPU, a ROM, a RAM, a display, and a communication unit. Programs causing the image processing device 10 to realize the image acquisition unit 20, the effect image generation unit 40, the cut-out image generation unit 50, and the presentation unit 70 are recorded on the ROM. The CPU reads and executes the programs recorded on the ROM. Thus, with the hardware configuration, the image acquisition unit 20, the effect image generation unit 40, the cut-out image generation unit 50, and the presentation unit 70 are realized. In addition, the image processing device 10 is a user terminal that a user has. Of course, the image processing device 10 may be a server that is connected to the user terminal via a network as will be described later. In addition, some functions of the image processing device 10 may be provided in the server.

Figure 4:
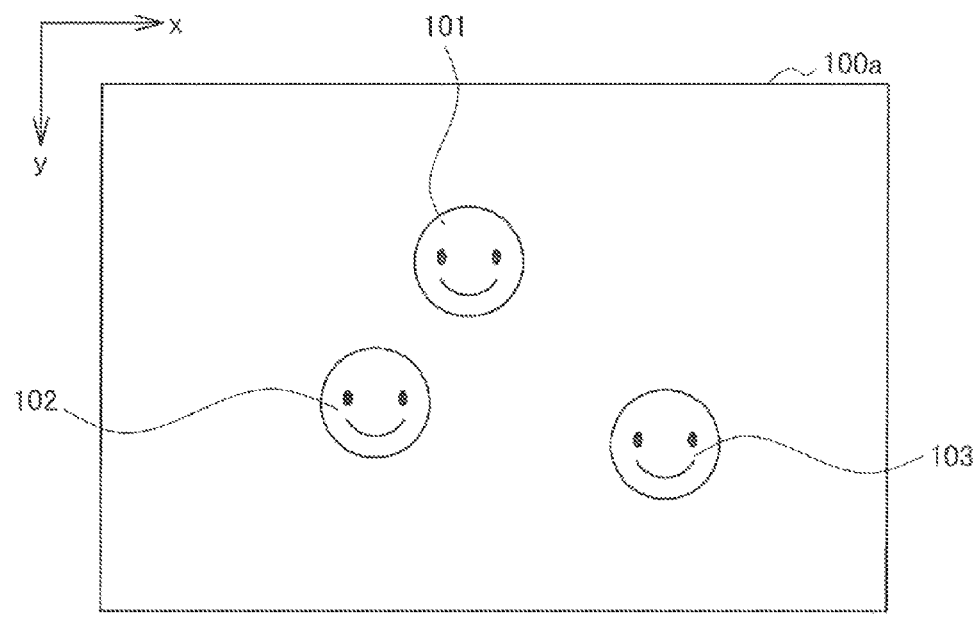
FIG. 4 is an illustrative diagram showing an example of an input image.

The image acquisition unit 20 acquires one or more of input images. The image acquisition unit 20 may acquire input images from a storage location (for example, a folder) designated by a user, and may acquire input images from a network. The image acquisition unit 20 outputs the acquired input images to the cut-out image generation unit 50. An example of an input image is shown in FIG. 4. The input image 100a shown in FIG. 4 includes faces images 101 to 103 of persons. In addition, each pixel of the input image is set with xy coordinate values. An X axis is, for example, the axis extending in the left-right direction in FIG. 4, and a y axis is, for example, the axis extending in the perpendicular direction in FIG. 4. The right direction of the x axis is the forward direction, and the lower direction of the y axis is the forward direction. Of course, x and y axes are not limited thereto. Hereinafter, the x axis direction is also referred to as a horizontal direction, and the y axis direction as a vertical direction.

Figure 3:
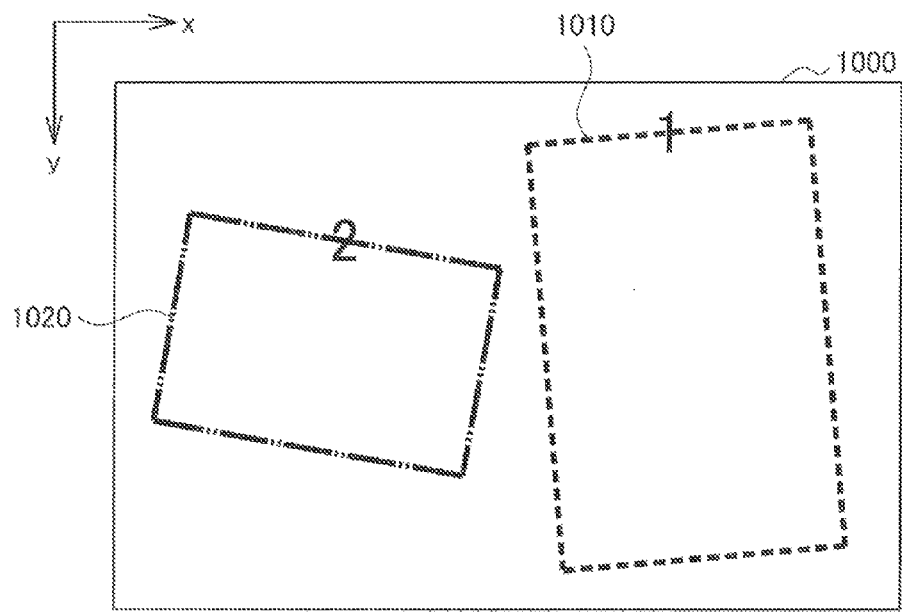
FIG. 3 is an illustrative diagram showing an example of an effect reference image that serves as a reference of an effect image.

The effect image generation unit 40 generates a plurality of effect images for a slide show. To be specific, the effect image generation unit 40 generates an effect reference image in which one or more of display regions are set. An example of an effect reference image is shown in FIG. 3. The effect reference image 1000 shown in FIG. 3 is set with display regions 1010 and 1020. In each pixel of the effect reference image, xy coordinate values are set. An X axis is, for example, the axis extending in the left-right direction in FIG. 3, and a y axis is, for example, the axis extending in the direction perpendicular thereto in FIG. 3. The right direction of the x axis is the forward direction, and the lower direction of the y axis is the forward direction. Of course, x and y axes are not limited thereto. Hereinafter, the x axis direction is also referred to as a horizontal direction, and the y axis direction as a vertical direction. The effect image generation unit 40 can arbitrarily set the number, the sizes, the positions, and the like of the display regions in the effect reference image.

In addition, the effect image generation unit 40 sets (designates) restrictive conditions that cut-out images should satisfy. Herein, the cut-out images are images cut out from input images. The cut-out images have rectangular (oblong or square) shapes, but may have other shapes. The restrictive conditions include, for example, a composition of a cut-out image, an aspect ratio of a cut-out image, the size of a cut-out image, the position of a cut-out image in an input image, and a zoom ratio of a cut-out image with respect to an input image. Furthermore, the restrictive conditions include the number of cut-out images, and presence or absence of overlap between cut-out images. Note that the "presence" of overlap between cut-out images means that overlap between cut-out images is allowed.

Furthermore, the restrictive conditions may include a first moving image condition in which a cut-out image is a first moving image, and a second moving image condition in which a cut-out image is a second moving image. The first moving image is a moving image obtained by zooming in on a subject included in an input image, and the second moving image is a moving image in which regions from a person image included in an input image to a subject in the direction of sight of the person image are sequentially displayed. In this manner, cut-out images may be still images, or moving images. Note that the effect image generation unit 40 may designate all of the restrictive conditions, or may designate only some of them. In addition, the effect image generation unit 40 may set the restrictive conditions based on an input operation from a user. Hereinafter, the restrictive conditions will be described.

The effect image generation unit 40 designates any one of, for example, a three-division composition, a zoom-up composition (three-division composition and zoom-up), a comparison composition, a diagonal composition, a comparison/diagonal composition, and a rising-sun composition as a composition of a cut-out image. Of course, the composition of a cut-out image is not limited thereto. The three-division composition is a composition in which subjects are disposed on virtual lines (lines compartmenting a cut-out image into 9 regions), or preferably on emphases (intersections of the virtual lines). The zoom-up composition is a composition in which only one subject is disposed on a virtual line or an emphasis. The comparison composition is a composition in which two subjects (main and sub) are disposed so as to be compared. The diagonal composition is a composition in which, when a diagonal divides a photo, subjects are disposed with balance in two regions, and two or more subjects can also be disposed in one region. The comparison/diagonal composition is a composition in which the comparison composition and the diagonal composition are combined. The rising-sun composition is a composition in which subjects are disposed at the center or in the periphery of a cut-out image.

In other words, the effect image generation unit 40 can designate the comparison/diagonal composition, the zoom-up composition, or the like, in addition to the three-division composition as a composition of a cut-out image. Details of the compositions will be described later.

The effect image generation unit 40 sets an aspect ratio of a display region as an aspect ratio of a cut-out image. In addition, the effect image generation unit 40 sets the size of a display region as the size of a cut-out image.

The effect image generation unit 40 designates the position of a cut-out image in an input image based on the positional relationship between display regions. Specifically, the effect image generation unit 40 detects the center point of each display region (hereinafter, also referred to as the "display region center point") when a plurality of display regions are set in an effect reference image. Furthermore, the effect image generation unit 40 computes the positional relationship of the display region center points.

For example, the effect image generation unit 40 detects the center point $(x_a1, y_a1)$ of the display region 1010 and the center point $(x_a2, y_a2)$ of the display region 1020 when the effect reference image 1000 shown in FIG. 3 is generated. Then, the effect image generation unit 40 computes the positional relationship of the points as $x_a1 > x_a2$, and $y_a1 = y_a2$.

In addition, the effect image generation unit 40 sets the relationship between x coordinates of the center points of cut-out images (hereinafter, also referred to as the "cut-out image center point") so that the magnitude relationship between the x coordinates of the display region center points coincides with the magnitude relationship between the x coordinates of the out-out image center points. In the same manner, the effect image generation unit 40 sets the relationship between y coordinates of the cut-out image center points so that the magnitude relationship between the y coordinates of the display region center points coincides with the magnitude relationship between the y coordinates of the cut-out image center points.

For example, the effect image generation unit 40 sets the positional relationship between the x coordinates which are $x_b1$ and $x_b2$ of cut-out images to be $x_b1 > x_b2$ when the effect reference image 1000 shown in FIG. 3 is generated. Furthermore, the effect image generation unit 40 sets the positional relationship between the y coordinates which are $y_b1$ and $y_b2$ to be $y_b1 = y_b2$. Accordingly, the effect image generation unit 40 designates the position of the cut-out image in the input image. In the present embodiment, when either of the relationship between the x coordinates or the relationship between the y coordinates of a cut-out image is satisfied, a restrictive condition relating to the position of the cut-out image is assumed to be satisfied.

The effect image generation unit 40 designates a zoom ratio of a cut-out image with respect to an input image. The lower limit of the zoom ratio is not particularly limited, but the upper limit thereof may be the lower value out of, for example, the width of an input image (the length thereof in the x axis direction)/the width of a cut-out image and the height of an input image (the length thereof in the y axis direction)/the height of a cut-out image. Note that a zoom ratio being 1 or higher indicates enlargement, and a zoom ratio being less than 1 indicates reduction.

The effect image generation unit 40 designates the number of display regions as the number of cut-out images. In addition the effect image generation unit 40 designates the presence or absence of overlap between cut-out images. Note that, when there is no overlap between cut-out images, the effect image generation unit 40 can impress on a user that the cut-out images are separate images.

In addition, the effect image generation unit 40 can cause restrictive conditions to include at least one of the first moving image condition and the second moving image condition. Details of the moving image conditions will be described later.

The effect image generation unit 40 designates at least one of the above-described restrictive conditions, and thereby generates restrictive condition information relating to the designated restrictive conditions. When a plurality of display regions are set, the effect image generation unit 40 sets the restrictive conditions in each display region. Then, the effect image generation unit 40 outputs the restrictive condition information to the cut-out image generation unit 50. Note that the effect image generation unit 40 may not generate the restrictive condition information.

The effect image generation unit 40 generates effect images based on cut-out image information (information in which cut-out images are associated with restrictive conditions that the cut-out images satisfy) given from the cut-out image generation unit 50. To be specific, the effect image generation unit 40 decides display regions corresponding to the cut-out images based on the restrictive conditions that the cut-out images satisfy, and causes the cut-out images to be superimposed on the decided display regions. Accordingly, the effect image generation unit 40 generates effect images. The effect image generation unit 40 causes the generated effect images to be sequentially displayed in the presentation unit 70. Accordingly, the effect image generation unit 40 displays a slide show.

The cut-out image generation unit 50 generates cut-out images by cutting the cut-out images from an input image.

Figure 5:
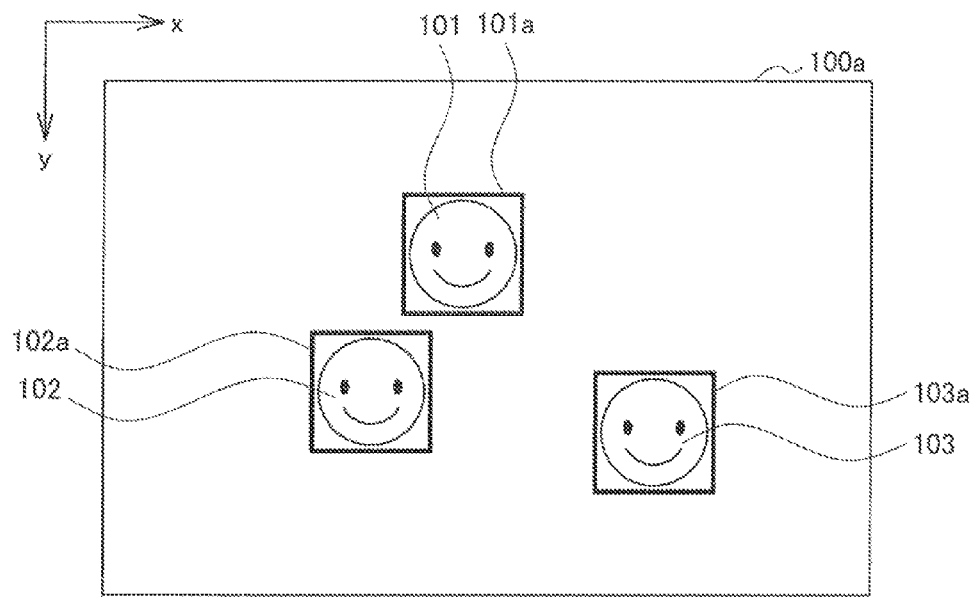
FIG. 5 is an illustrative diagram showing a detailed face detection process.

To be specific, the cut-out image generation unit 50 performs the following process. The cut-out image generation unit 50 analyzes the input image, and then detects subjects (specifically, for example, face images of persons, or object images) from the input image. When the input image 100*a* is given, for example, the cut-out image generation unit 50 detects the face images 101 to 103 of persons from the input image 100*a*. The cut-out image generation unit 50 may superimpose frame images on the detected face images. For example, the cut-out image generation unit 50 may superimpose frame images 101*a* to 103*a* on the face images 101 to 103 as shown in FIG. 5. Furthermore, the cut-out image generation unit 50 also detects the directions of sight of the face images when the face images of the persons are detected.

Then, the cut-out image generation unit 50 determines whether or not restrictive condition information is given from the effect image generation unit 40. When the restrictive condition information is determined to be given, the cut-out image generation unit 50 performs a first cut-out image generation process, and when the restrictive condition information is determined not to be given, the cut-out image generation unit 50 performs a second cut-out image generation process. The cut-out image generation unit 50 generates cut-out image information in which cut-out images generated from the first cut-out image generation process or the second cut-out image generation process are associated with the restrictive conditions that the cut-out images satisfy, and then outputs the information to the effect image generation unit 40.

The first cut-out image generation process is a process for generating cut-out images that satisfy the restrictive conditions based on the restrictive condition information. As described above, the restrictive conditions include, for example, the compositions of the cut-out images, aspect ratios of the cut-out images, the sizes of the cut-out images, the positions of the cut-out images in the input image, and zoom ratios of the cut-out images with respect to the input image. Furthermore, the restrictive conditions include the number of cut-out images, and the presence or absence of overlap between the cut-out images. Furthermore, the restrictive conditions include the first moving image condition and the second moving image condition. Thus, the cut-out image generation unit 50 cuts the cut-out images that satisfy the restrictive conditions from the input image. Note that the cut-out image generation unit 50 arbitrarily sets a restrictive condition with regard to a restrictive condition that has not been designated, and cuts a cut-out image satisfying the condition from the input image.

The second cut-out image generation process is a process in which cut-out images are arbitrarily cut out from an input image, and then restrictive conditions that the cut-out images satisfy are set based on parameters of the cut-out images. In other words, the cut-out image generation unit 50 arbitrarily cuts the cut-out images from the input image, and sets the restrictive conditions that the cut-out images satisfy based on the parameters of the cut-out images. Then, the cut-out image generation unit 50 generates restrictive condition information in which the cut-out images are associated with the restrictive conditions that the cut-out images satisfy, and then outputs the information to the effect image generation unit 40. Note that the parameters of the cut-out images are aspect ratios of the cut-out images, the sizes thereof, and the like, and correspond to the above-described restrictive conditions. The presentation unit 70 sequentially displays effect images according to the control of the effect image generation unit 40.

Herein, some specific example of the first cut-out image generation process will be described. Note that cut-out images can be variously cut out according to restrictive conditions. Thus, in each example below, a specific cut-out image is generated according to a certain restrictive condition, but other cut-out images may of course be generated. First, an example in which a composition and the number of cut-out images are designated as restrictive conditions will be described. In the example, it is assumed that the composition of a cut-out image is designated to be the three-division composition, the zoom-up composition (three-division composition and zoom-up), the comparison composition, the diagonal composition, the comparison/diagonal composition, or the rising-sun composition, and the number of cut-out images is designated to be one. When, for example, one cut-out image having an aspect ratio different from that of an input image is necessary, the effect image generation unit 40 sets the restrictive condition.

Figure 6:
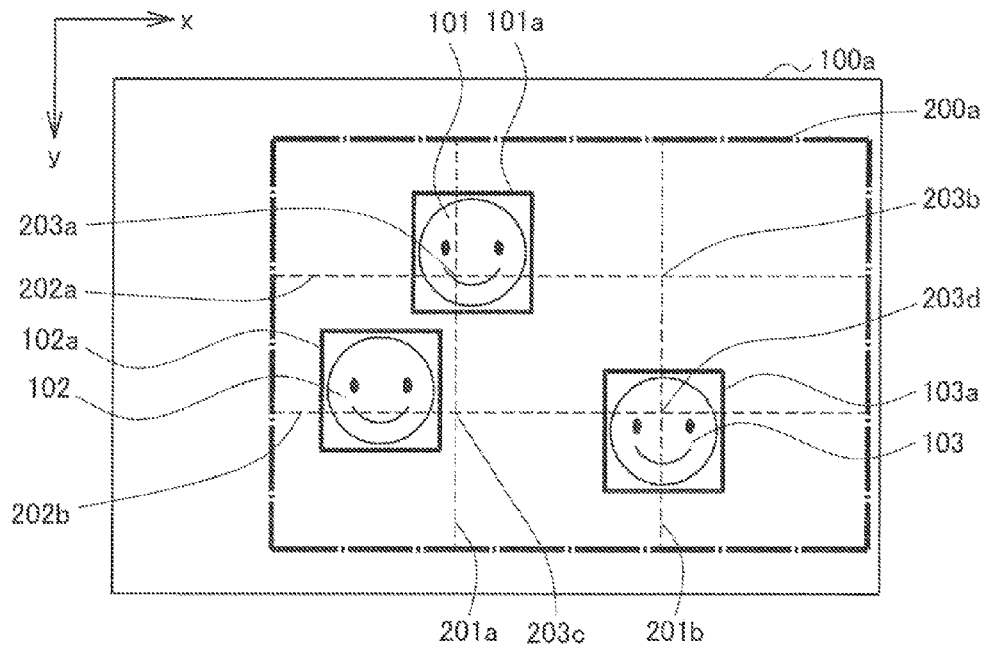
FIG. 6 is an illustrative diagram showing an example of image analysis.

FIG. 6 shows an example in which cut-out images with the three-division composition are cut out. In this example, a cut-out image 200a is cut out from the input image 100a. In the cut-out image 200a, virtual lines 201a, 201b, 202a, and 202b are set. In addition, the intersections of the virtual lines 201a, 201b, 202a, and 202b form emphases 203a, 203b, 203c, and 203d. In addition, all subjects, which are the face images 101a to 103a are disposed on the virtual lines. Particularly, the face image 101a is disposed on the emphasis 203a, and the face image 103a is disposed on the emphasis 203d. Note that the effect image generation unit 40 may include the type of subjects (for example, the type of face images) included in the cut-out images in the restrictive condition regarding the composition of the cut-out images.

Figure 7:
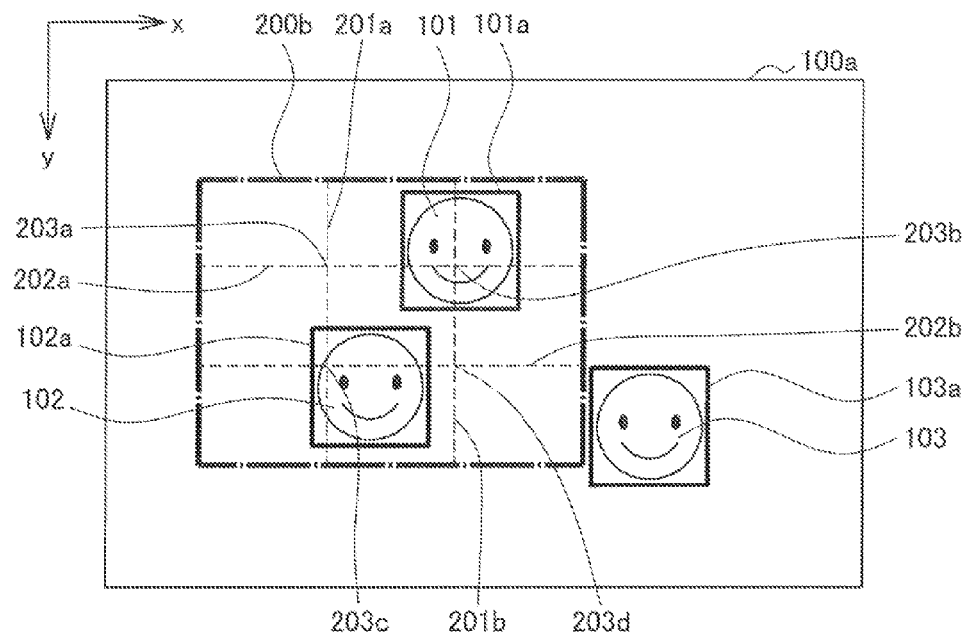
FIG. 7 is an illustrative diagram showing an example of image analysis.

FIG. 7 shows an example in which the cut-out images with the comparison/diagonal composition are cut out. In this example, a cut-out image 200b is cut out from the input image 100a. In the cut-out image 200b, the virtual lines 201a, 201b, 202a, and 202b are set. In addition, the intersections of the virtual lines 201a, 201b, 202a, and 202b form the emphases 203a, 203b, 203c, and 203d. In addition, the face images 101a and 102a are disposed on the virtual lines. Note that the effect image generation unit 40 may include the type of subject (for example, the type of face images) disposed on the diagonal in the restrictive condition on the composition of the cut-out images.

Figure 8:
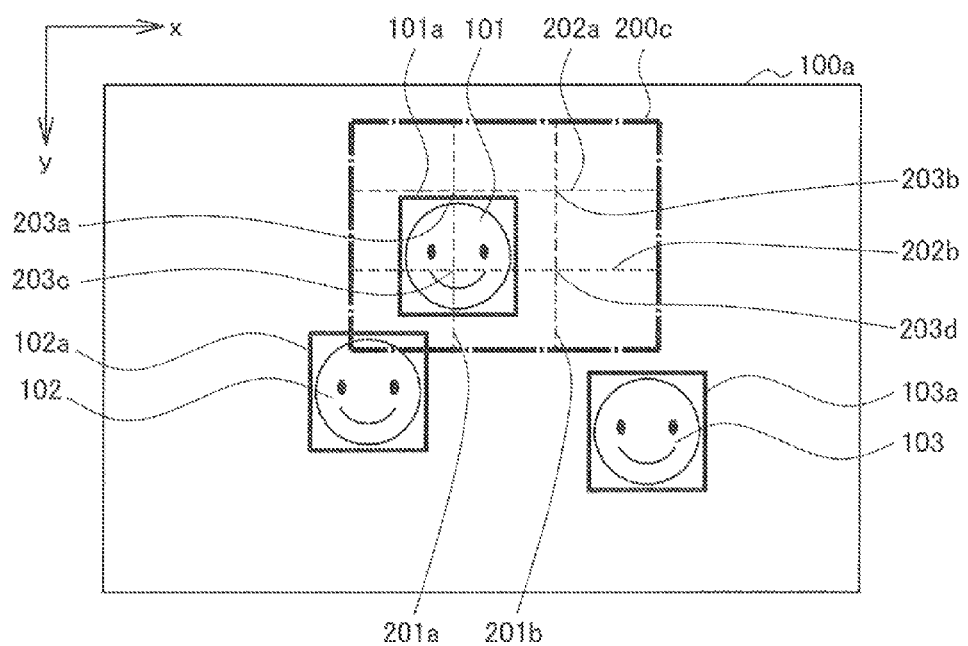
FIG. 8 is an illustrative diagram showing an example of image analysis.

FIG. 8 shows an example in which the cut-out images with the zoom-up composition are cut out. In this example, a cut-out image 200c is cut out from the input image 100a. In the cut-out image 200c, the virtual lines 201a, 201b, 202a, and 202b are set. In addition, the intersections of the virtual lines 201a, 201b, 202a, and 202b form the emphases 203a, 203b, 203c, and 203d. In addition, the face images 101a to 101b are disposed on the virtual lines. Note that the type of subjects (for example, the type of face images) disposed on the diagonal may be included in the restrictive condition. In addition, when the zoom-up composition is included in restrictive conditions, there are many cases in which the zoom ratio as a restrictive condition indicates a positive value (a zoom ratio indicating enlargement of cut-out images in comparison to the input image). This is because the zoom-up composition is intended to make a specific subject stand out by enlarging the specific subject to be shown.

Figure 9:
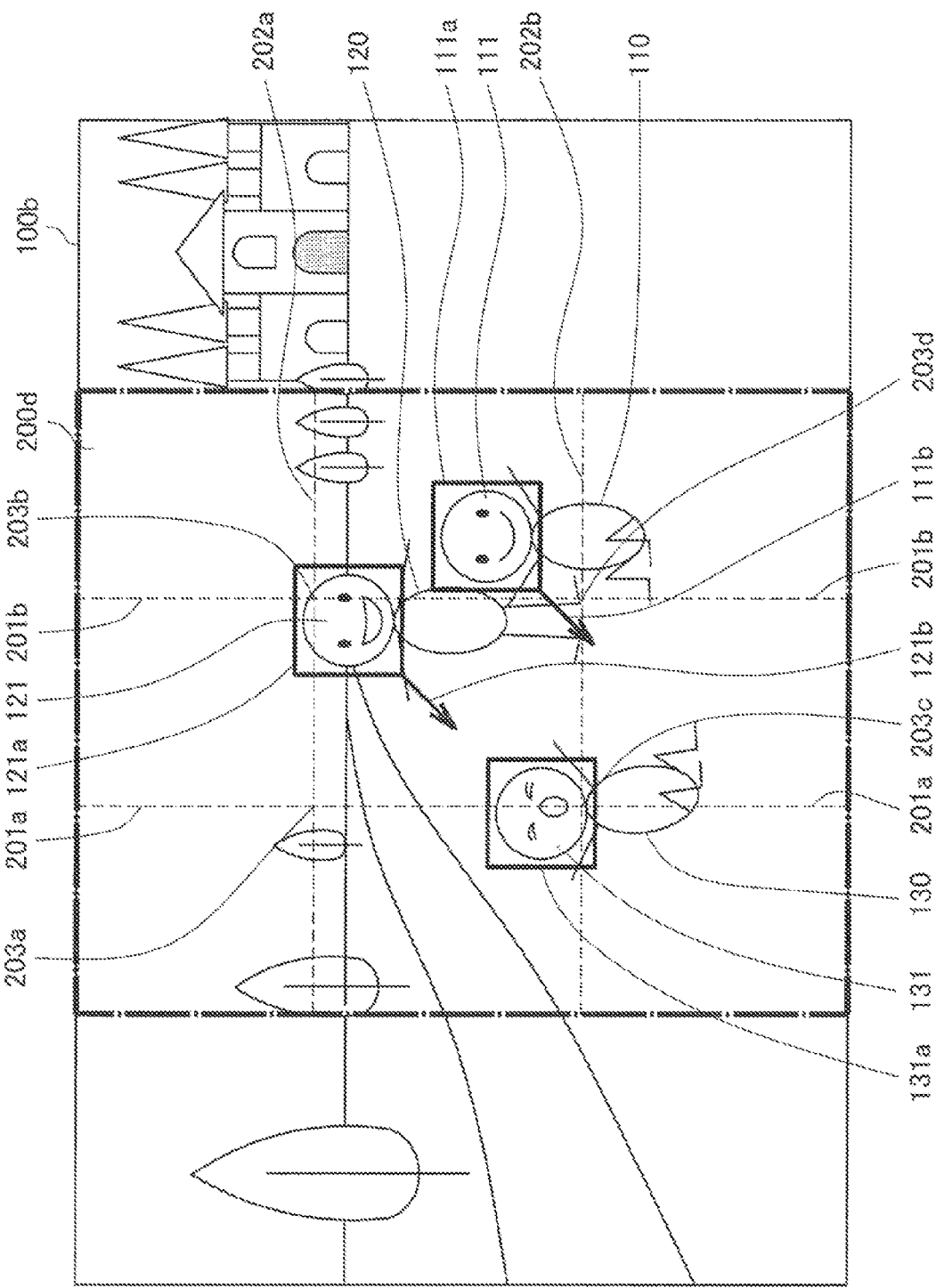
FIG. 9 is an illustrative diagram showing an example of image analysis.
Figure 10:
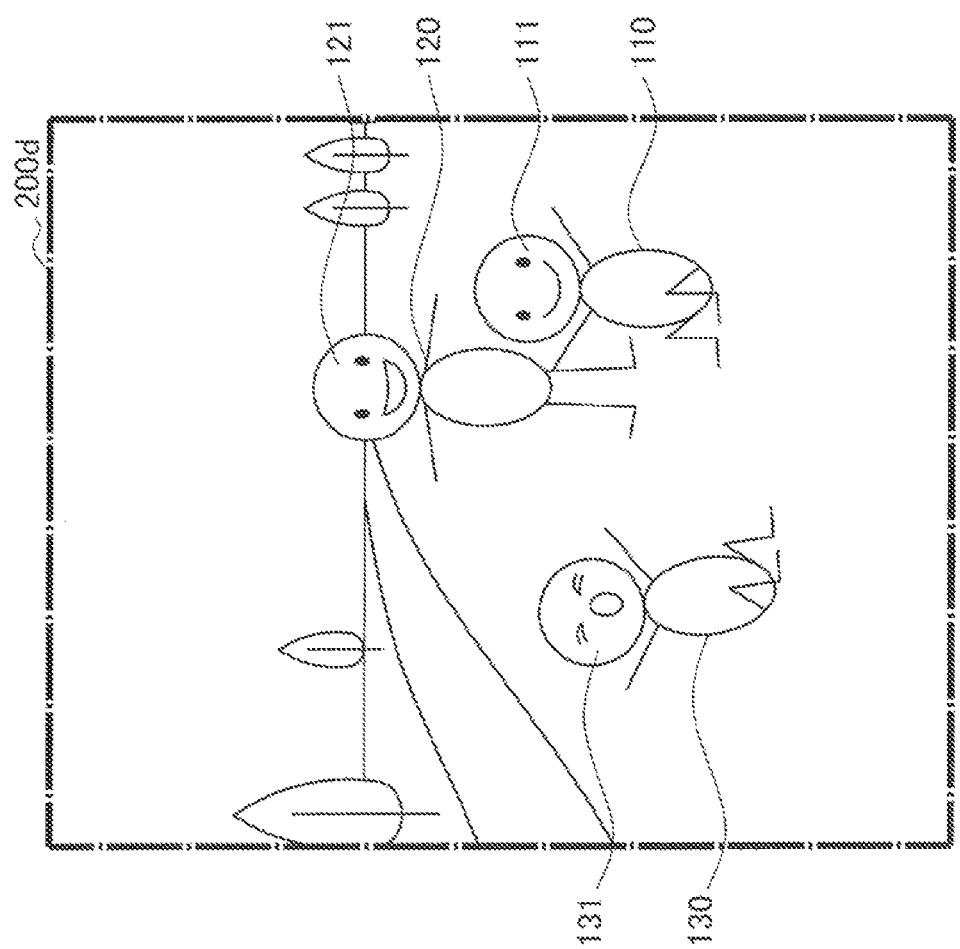
FIG. 10 is an illustrative diagram showing an example of image analysis.

Furthermore, the cut-out image generation unit 50 also includes the region indicated by the direction of sight of a face image in a cut-out image. A specific example thereof is shown in FIGS. 9 and 10. In the example shown in FIGS. 9 and 10, the cut-out image generation unit 50 cuts out a cut-out image 200d from an input image 100b. The input image 100b includes person images 110, 120, and 130. The cut-out image generation unit 50 first detects face images 111, 121, and 131 of the person images 110, 120, and 130, and superimposes frame images 111a, 121a, and 131a over the face images 111, 121, and 131. Then the cut-out image generation unit 50 detects the directions of sight of the face images 111, 121, and 131. Arrows 111b and 121b respectively indicate the directions of sight of the face images 111 and 121.

Then, the cut-out image generation unit 50 cuts the cut-out image 200d from the input image 100b. In the cut-out image 200d, the virtual lines 201a, 201b, 202a, and 202b are set. In addition, the intersections of the virtual lines 201a, 201b, 202a, and 202b form the emphases 203a, 203b, 203c, and 203d. In addition, the face images 111, 121, and 131 are disposed on the virtual lines. Furthermore, the cut-out image 200d includes the regions on the directions of sight of the face images 111, 121, and 131. For example, the cut-out image 200d includes the lower-left regions of the face images 111 and 121. FIG. 10 shows the cut-out image 200d. In FIG. 10, the frame images are omitted.

Figure 11:
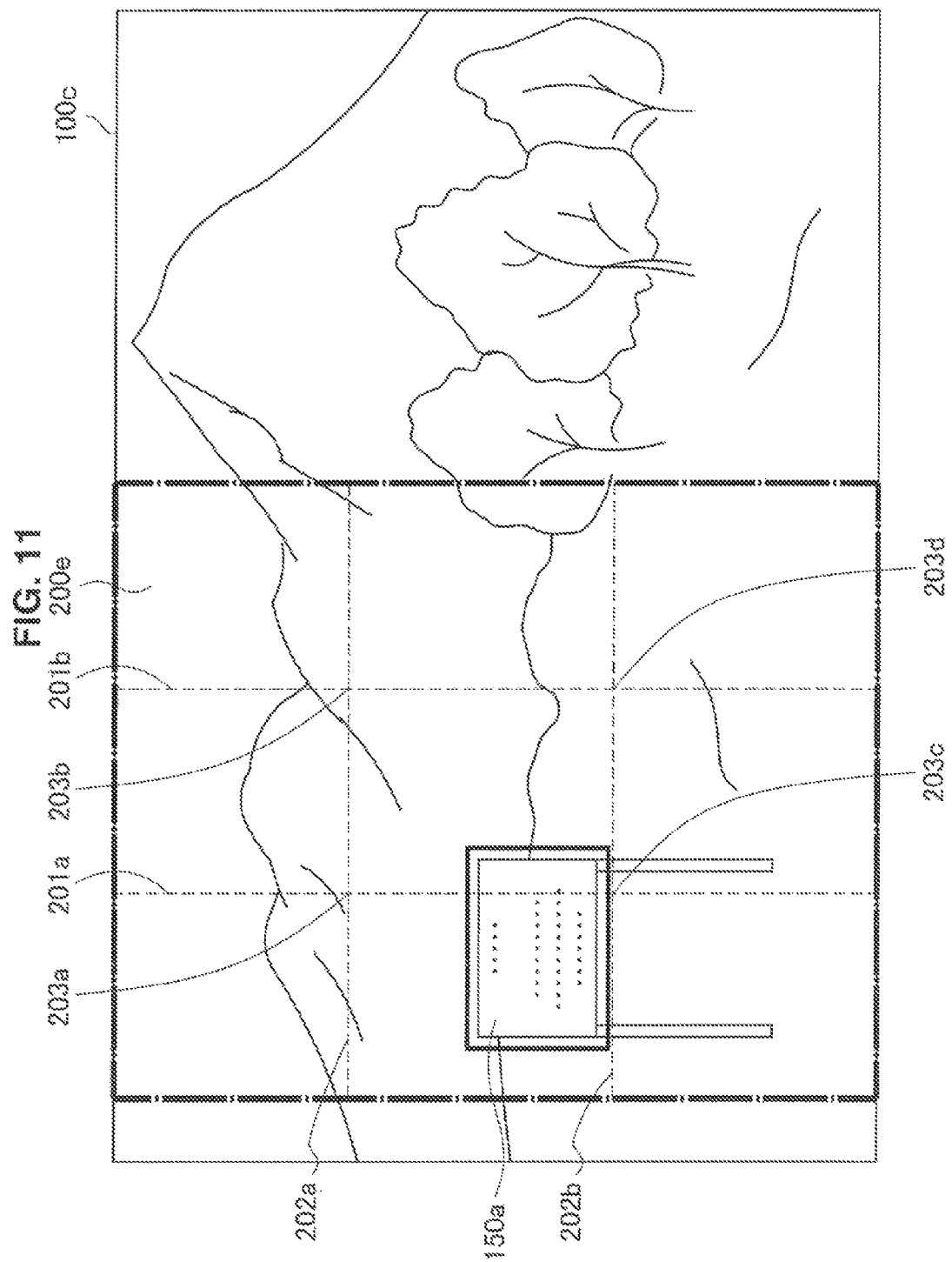
FIG. 11 is an illustrative diagram showing an example of image analysis.
Figure 12:
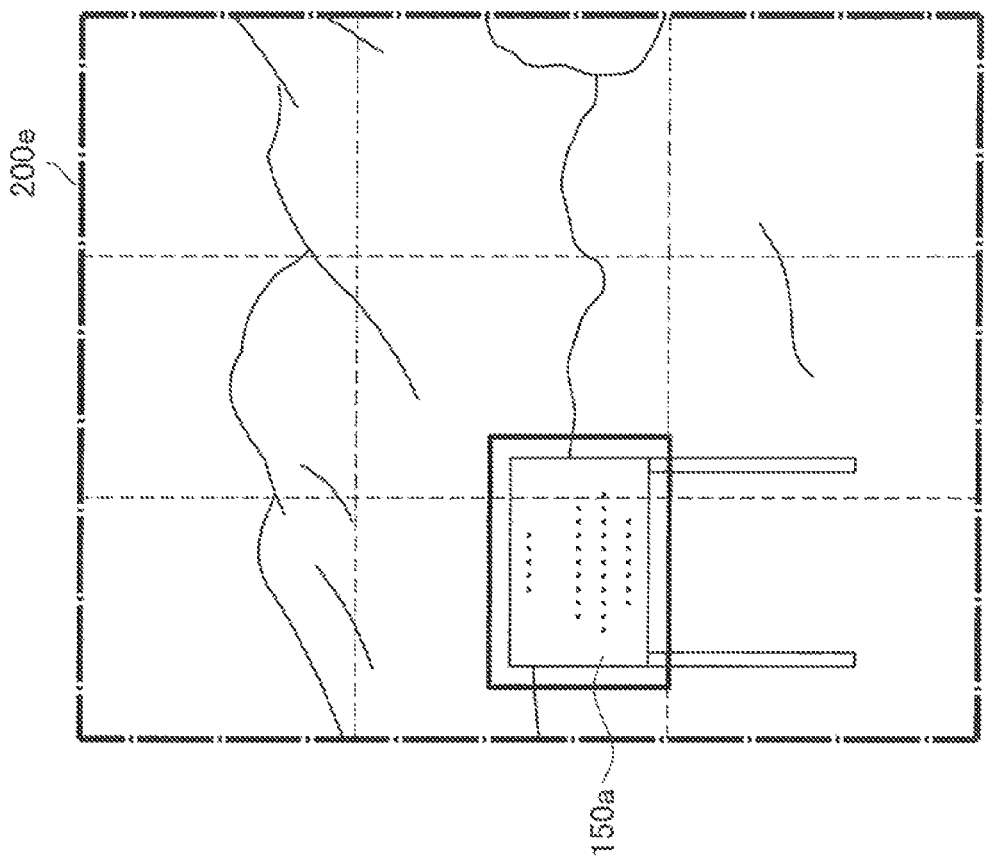
FIG. 12 is an illustrative diagram showing an example of image analysis.

The cut-out image generation unit 50 disposes object images on virtual lines when person images are not included in an input image. A specific example thereof is shown in FIGS. 11 and 12. In this example, the cut-out image generation unit 50 cuts a cut-out image 200e from an input image 100c. The input image 100c includes an object image 150a. The cut-out image generation unit 50 first detects the object image 150a.

Then, the cut-out image generation unit 50 cuts the cut-out image 200e from the input image 100c. In the cut-out image 200e, the virtual lines 201a, 201b, 202a, and 202b are set. In addition, the intersections of the virtual lines 201a, 201b, 202a, and 202b form the emphases 203a, 203b, 203c, and 203d. In addition the object image 150a is disposed on the virtual lines. FIG. 12 shows the cut-out image 200e. Note that, in the restrictive conditions, the type of subjects included in a cut-out image, to be specific, the type of subjects disposed on virtual lines (which face images of persons are to be included on virtual lines, or the like), may be designated.

Next, an example in which a plurality of cut-out images are generated will be described. According to the example, since the cut-out image generation unit 50 can generate a plurality of cut-out images from one input image, the input image can substantially be padded. First, a first example will be described based on FIGS. 3, 13, and 14. In the first example, the effect image generation unit 40 generates the effect reference image 1000 shown in FIG. 3. Therefore, the number of cut-out images is designated to be two. In addition, in this example, as restrictive conditions, the composition, aspect ratio, size, position in the input image, and zoom ratio of the cut out images, and the presence or absence of overlap between the cut-out images are designated. The composition is assumed to be designated as the three-division composition. The aspect ratios and sizes coincide with those of the display regions 1010 and 1020. In addition, it is assumed that the zoom ratio is designated to be about 1, and the absence of overlap between the cut-out images is designated. In addition, in this example, the cut-out image generation unit 50 acquires an input image 100d shown in FIG. 13 as an input image. The input image 100d includes person images 140 to 170.

The cut-out image generation unit 50 analyzes the input image 100d and then detects face images 141 to 171 of the persons from the input image 100d. Then, the cut-out image generation unit 50 cuts cut-out images 300 and 310 from the input image 100d based on the above-described restrictive conditions. The face images 141 to 171 in the cut-out images 300 and 310 are all disposed on virtual lines. In addition, the aspect ratio and size of the cut-out images 300 and 310 coincide with those of the display regions 1010 and 1020. In addition, the center point $(x_b1,y_b1)$ of the cut-out image 300 and the center point $(x_b2,y_b2)$ of the cut-out image 310 satisfy the relationship of $x_b1>x_b2$, and $y_b1=y_b2$. In addition, the cut-out images 300 and 310 do not overlap. Thus, the cut-out images 300 and 310 satisfy the restrictive conditions. The cut-out image generation unit 50 generates cut-out image information in which the cut-out images 300 and 310 are associated with the restrictive conditions that the cut-out images 300 and 310 satisfy, and then outputs the information to the effect image generation unit 40.

The effect image generation unit 40 decides the display regions corresponding to the cut-out images 300 and 310 based on the restrictive conditions that the cut-out images 300 and 310 satisfy. In the first example, the cut-out image 300 corresponds to the display region 1010. This is because the size and aspect ratio of the cut-out image 300 coincide with those of the display region 1010, and the position of the center point of the cut-out image 300 coincides with that of the display region 1010. In the same manner, the cut-out image 310 corresponds to the display region 1020. Thus, the effect image generation unit 40 superimposes the cut-out image 300 over the display region 1010, and superimposes the cut-out image 310 over the display region 1020. Accordingly, the effect image generation unit 40 generates an effect image shown in FIG. 14.

In the first example, since the positional relationship between the cut-out images in the input image coincides with the positional relationship between cut-out images in the effect image, the effect image generation unit 40 can generate an effect image that does not give discomfort to users. Furthermore, since the cut-out images do not overlap, the effect image generation unit 40 can impress on a user that the cut-out images are separate images. In other words, the effect image generation unit 40 can provide a user with a natural slide show.

Figure 15:
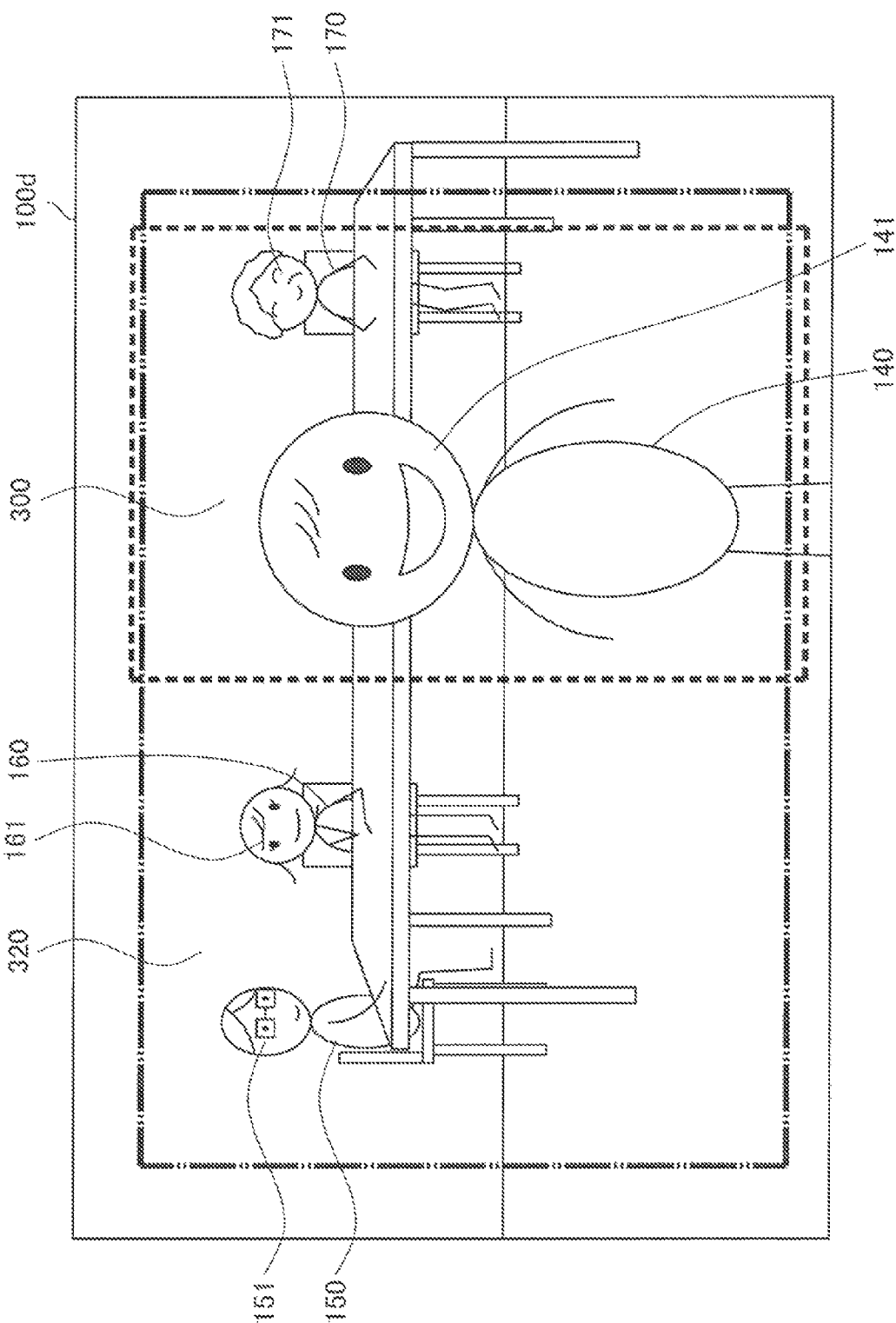
FIG. 15 is an illustrative diagram showing an example of image analysis.
Figure 16:
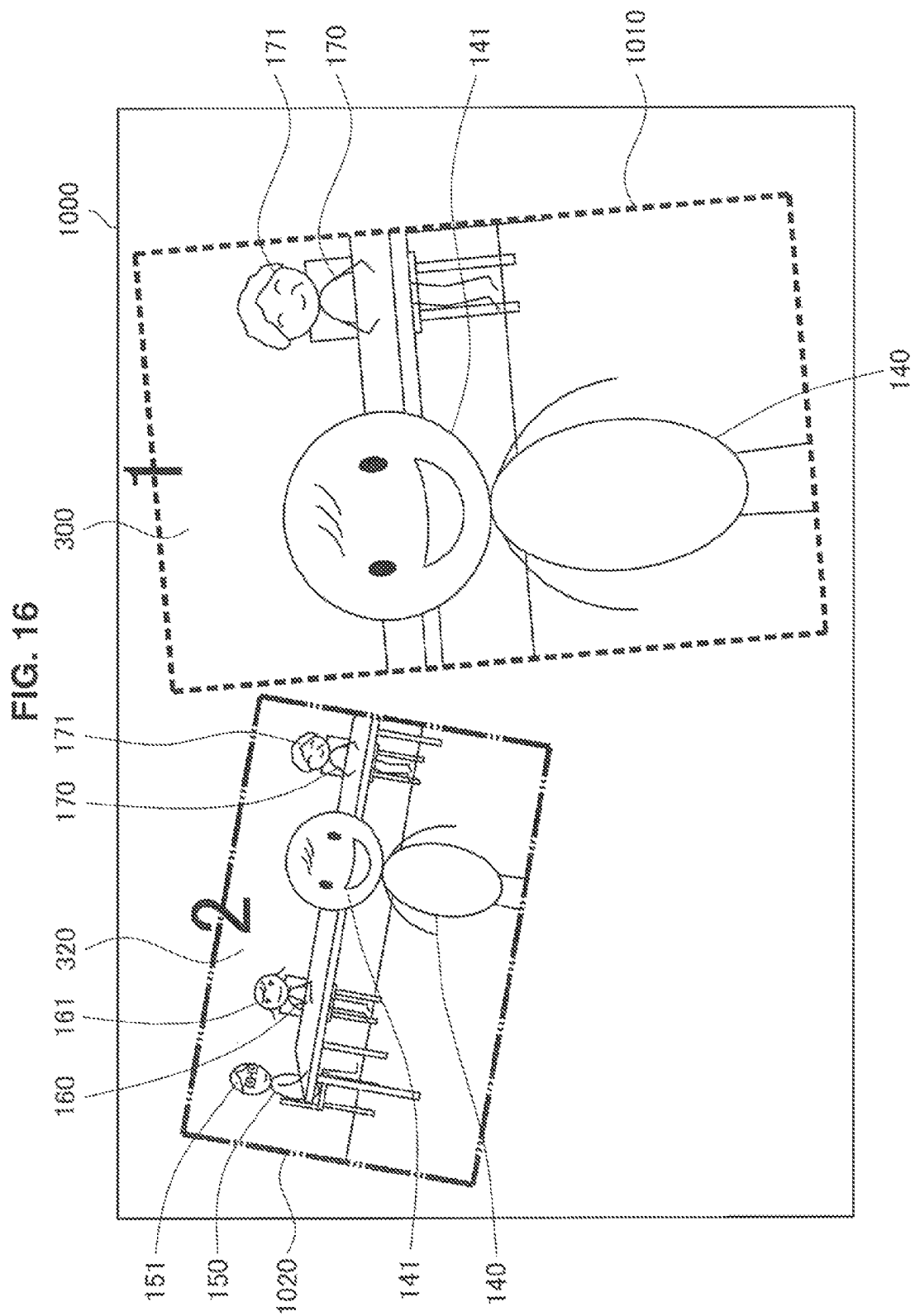
FIG. 16 is an illustrative diagram showing an example of an effect image.

Next, a second example will be described based on FIGS. 3, 15, and 16. In the second example, the effect image generation unit 40 generates the effect reference image 1000 shown in FIG. 3. Thus, the number of cut-out images is designated to be two. In addition, in this example, as restrictive conditions, the composition, aspect ratio, size, position in the input image, and zoom ratio of the cut-out images, and the presence or absence of overlap between the cut-out images are designated. The composition is assumed to be designated as the three-division composition. The aspect ratio and size coincide with those of the display regions 1010 and 1020. In addition, it is assumed that the zoom ratio is designated to be about 0.5 to 1, and the presence of overlap between the cut-out images is designated. In addition, in this example, the cut-out image generation unit 50 acquires the input image 100d shown in FIG. 15 as an input image.

The cut-out image generation unit 50 analyzes the input image 100d, and then detects the face images 141 to 171 of the persons from the input image 100d. Then, the cut-out image generation unit 50 cuts cut-out images 300 and 320 from the input image 100d based on the above-described restrictive conditions. Then, the cut-out image generation unit 50 reduces the size of the cut-out image 320 so as to coincide with the size of the display region 1020. In this case, the zoom ratio is set to be about 0.5.

Accordingly, the face images 141 to 171 in the cut-out images 300 and 320 are all disposed on virtual lines. In addition, the aspect ratio and size of the cut-out images 300 and 320 coincide with those of the display regions 1010 and 1020. In addition, the center point $(x_b1,y_b1)$ of the cut-out image 300 and the center point $(x_b3,y_b3)$ of the cut-out image 320 satisfy the relationship of $x_b1>x_b3$, and $y_b1=y_b3$. In addition, the cut-out images 300 and 320 overlap. Thus, the cut-out images 300 and 320 satisfy the restrictive conditions. The cut-out image generation unit 50 generates cut-out image information in which the cut-out images 300 and 320 are associated with the restrictive conditions that the cut-out images 300 and 320 satisfy, and then outputs the information to the effect image generation unit 40.

The effect image generation unit 40 decides the display regions corresponding to the cut-out images 300 and 320 based on the restrictive conditions that the cut-out images 300 and 320 satisfy. In the second example, the cut-out image 300 corresponds to the display region 1010. This is because the size and aspect ratio of the cut-out image 300 coincide with those of the display region 1010, and the position of the center point of the cut-out image 300 coincides with that of the display region 1010. In the same manner, the cut-out image 320 corresponds to the display region 1020. Thus, the effect image generation unit 40 superimposes the cut-out image 300 over the display region 1010, and superimposes the cut-out image 320 over the display region 1020. Accordingly, the effect image generation unit 40 generates an effect image shown in FIG. 16.

In the second example, since the positional relationship between the cut-out images in the input image coincides with the positional relationship between cut-out images in the effect image, the effect image generation unit 40 can generate an effect image that does not give discomfort to users.

Figure 17:
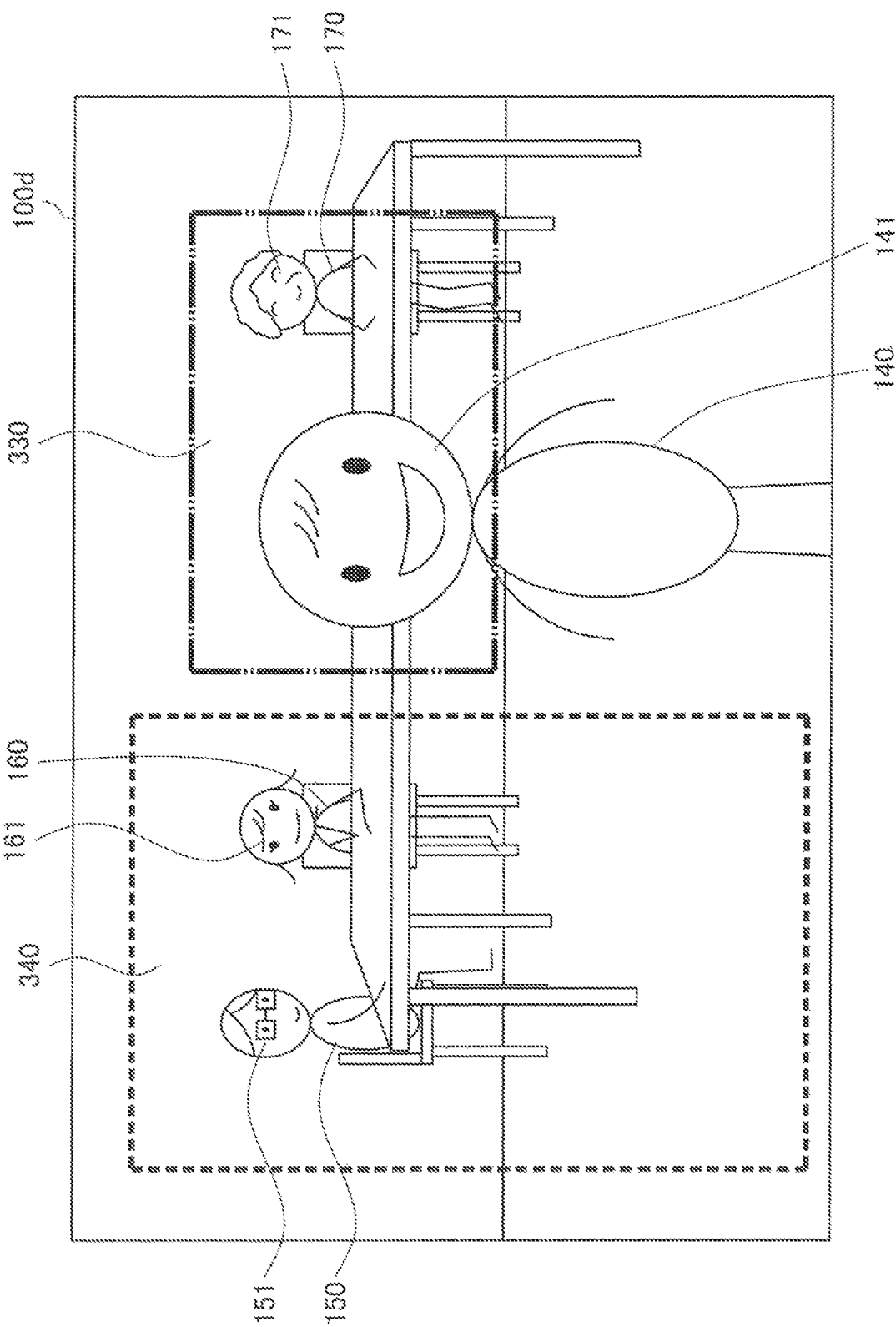
FIG. 17 is an illustrative diagram showing an example of image analysis.
Figure 18:
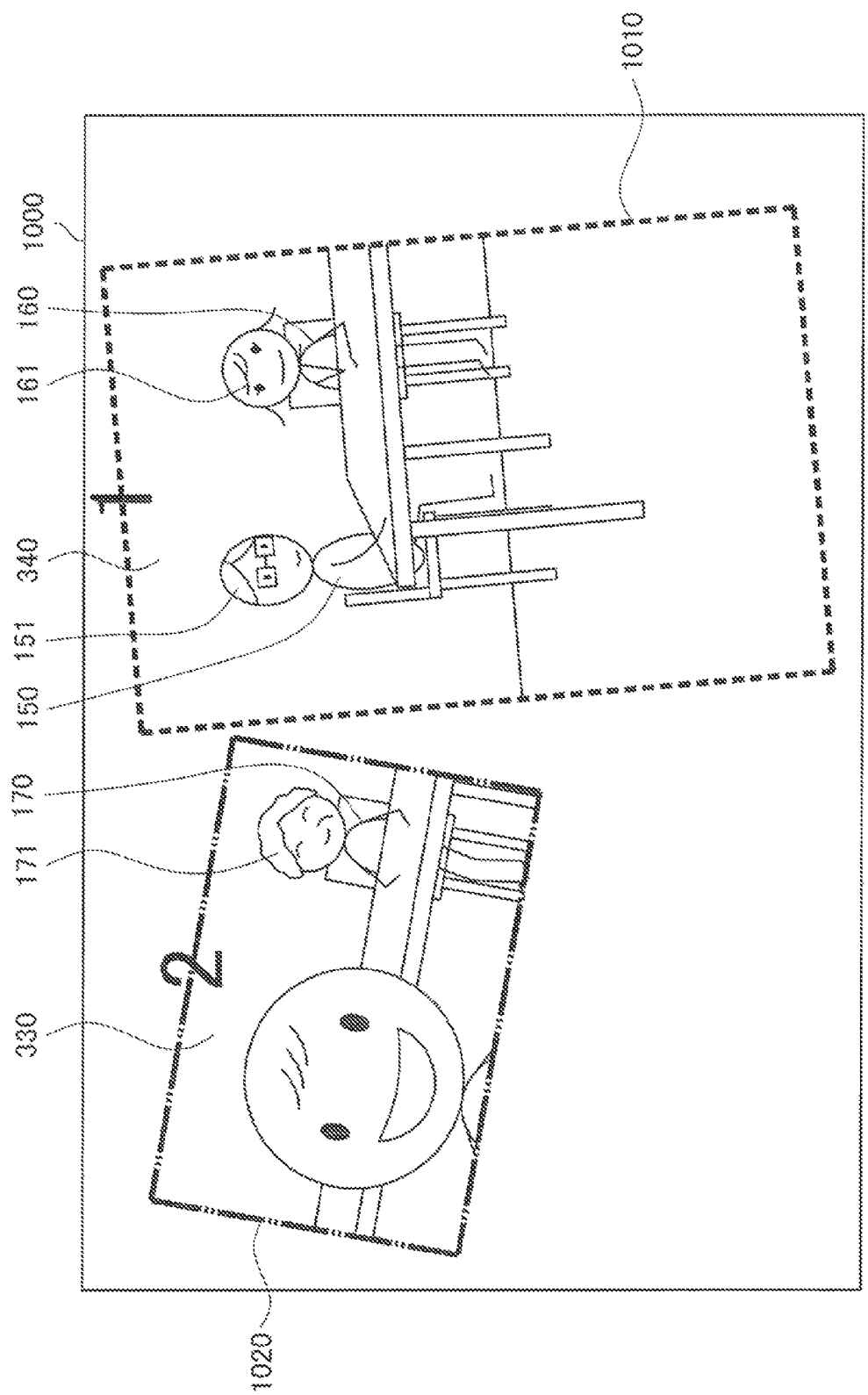
FIG. 18 is an illustrative diagram showing an example of an effect image.

Next, a third example will be described based on FIGS. 3, 17, and 18. In the third example, the effect image generation unit 40 generates the effect reference image 1000 shown in FIG. 3. Thus, the number of cut-out images is designated to be two. In addition, in this example, as restrictive conditions, the composition, aspect ratio, size, and zoom ratio of the cut-out images, and the presence or absence of overlap between the cut-out images are designated. In other words, in this example, the position of the cut-out images is not designated. The composition is assumed to be designated as the three-division composition. The aspect ratio and size coincide with those of the display regions 1010 and 1020. In addition, it is assumed that the zoom ratio is designated to be about 1, and the absence of overlap between the cut-out images is designated. In addition, in this example, the cut-out image generation unit 50 acquires the input image 100d shown in FIG. 17 as an input image.

The cut-out image generation unit 50 analyzes the input image 100d, and then detects the face images 141 to 171 of the persons from the input image 100d. Then, the cut-out image generation unit 50 cuts cut-out images 330 and 340 from the input image 100d based on the above-described restrictive conditions.

The face images 141 to 171 in the cut-out images 330 and 340 are all disposed on virtual lines. In addition, the aspect ratio and size of the cut-out images 330 and 340 coincide with those of the display regions 1020 and 1010. In addition, the cut-out images 330 and 340 do not overlap. Thus, the cut-out images 330 and 340 satisfy the restrictive conditions. The cut-out image generation unit 50 generates cut-out image information in which the cut-out images 330 and 340 are associated with the restrictive conditions that the cut-out images 330 and 340 satisfy, and then outputs the information to the effect image generation unit 40.

The effect image generation unit 40 decides the display regions corresponding to the cut-out images 330 and 340 based on the restrictive conditions that the cut-out images 330 and 340 satisfy. In the third example, the cut-out image 330 corresponds to the display region 1020. This is because the size and aspect ratio of the cut-out image 330 coincide with those of the display region 1020. In the same manner, the cut-out image 340 corresponds to the display region 1010. Thus, the effect image generation unit 40 superimposes the cut-out image 330 over the display region 1020, and superimposes the cut-out image 340 over the display region 1010. Accordingly, the effect image generation unit 40 generates an effect image shown in FIG. 18.

In the third example, since the cut-out images do not overlap, the effect image generation unit 40 can impress on a user that the cut-out images are separate images.

Figure 19:
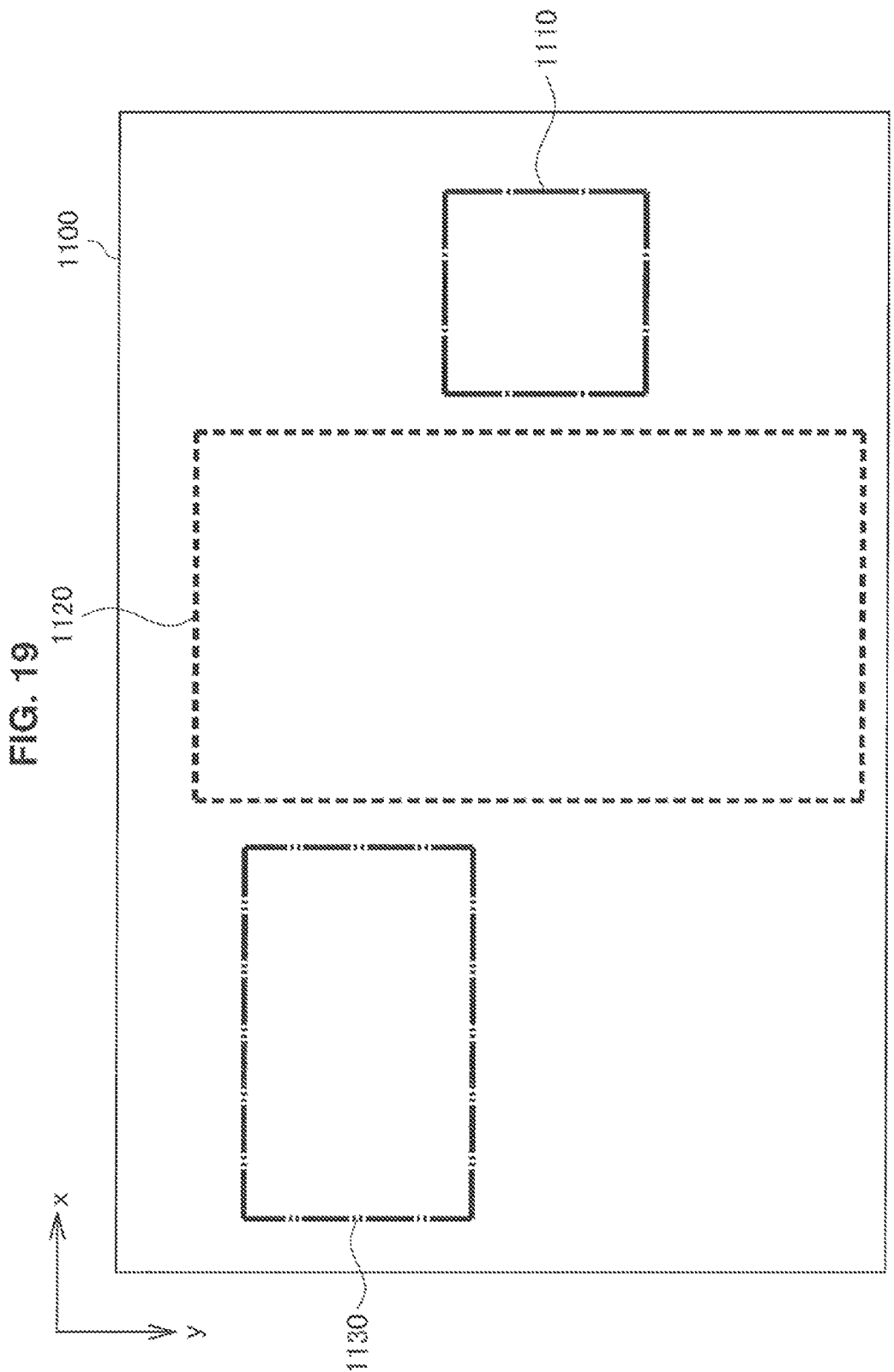
FIG. 19 is an illustrative diagram showing an example of an effect reference image.
Figure 20:
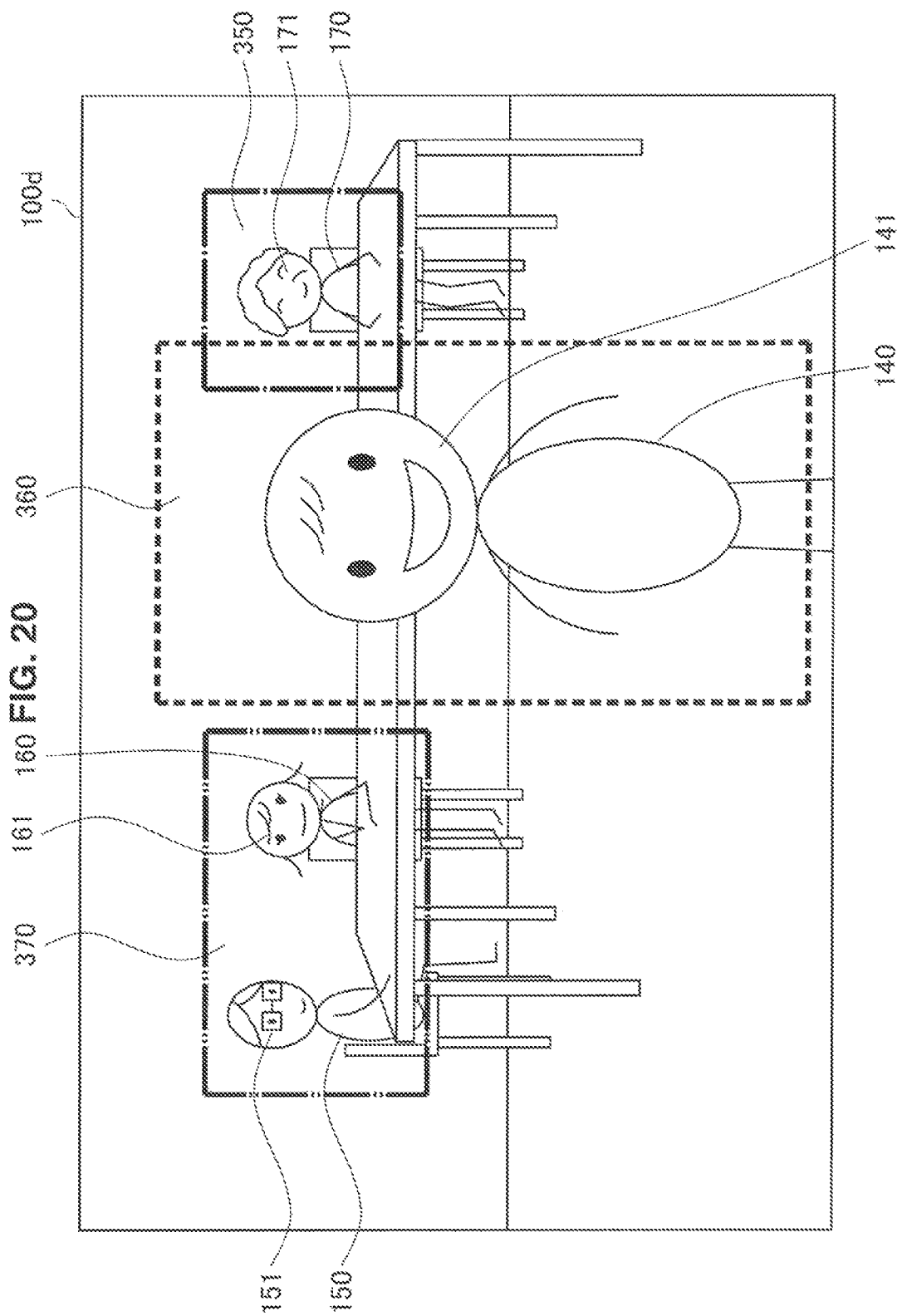
FIG. 20 is an illustrative diagram showing an example of image analysis.
Figure 21:
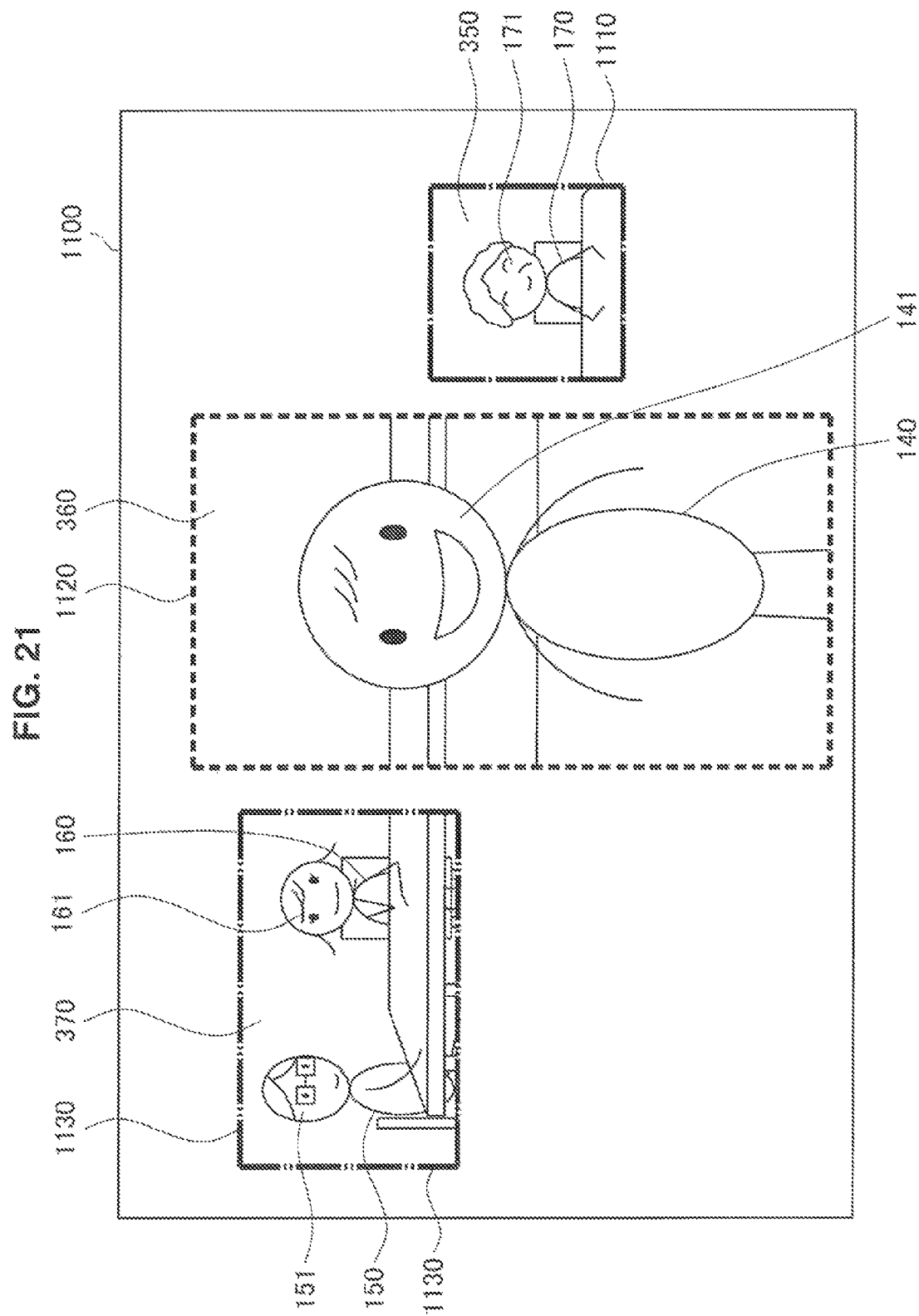
FIG. 21 is an illustrative diagram showing an example of an effect image.

Next, a fourth example will be described based on FIGS. 19 to 21. In the fourth example, the effect image generation unit 40 generates an effect reference image 1100 shown in FIG. 19. The effect reference image 1100 includes display regions 1110 to 1130.

Accordingly, the number of cut-out images is designated to be three. In addition, in this example, as restrictive conditions, the composition, aspect ratio, size, and zoom ratio, and the position in an input image of the cut-out images, and the presence or absence of overlap between the cut-out images are designated. The composition is assumed to be the three-division composition. The aspect ratio and size coincide with those of the display regions 1110 to 1130. In addition, it is assumed that the zoom ratio is designated to be about 0.5 to 1, and the presence of overlap between the cut-out images is designated. The center points $(x_a4,y_a4)$, $(x_a5,y_a5)$, and $(x_a6,y_a6)$ of the display regions 1110 to 1130 at least satisfy the relationship of $x_a4>x_a5>x_a6$. Therefore, it is necessary for the cut-out image center points $(x_b4,y_b4)$, $(x_b5,y_b5)$, and $(x_b6,y_b6)$ to satisfy at least the condition of $x_b4>x_b5>x_b6$. In addition, in this example, the cut-out image generation unit 50 acquires the input image 100d shown in FIG. 20 as an input image.

The cut-out image generation unit 50 analyzes the input image 100d, and then detects the face images 141 to 171 of the persons from the input image 100d. Then, the cut-out image generation unit 50 cuts cut-out images 350 to 370 from the input image 100d based on the above-described restrictive conditions. Then, the cut-out image generation unit 50 reduces the cut-out images 360 and 370 so that the sizes of the cut-out images 360 and 370 coincide with those of the display regions 1120 and 1130. The zoom ratio is within the range of 0.5 to 1.

Accordingly, the face images 141 to 171 in the cut-out images 350 to 370 are all disposed on virtual lines. In addition, the aspect ratios and the sizes of the cut-out images 350 to 370 coincide with those of the display regions 1110 to 1130. In addition, the zoom ratio is within the range of 0.5 to 1. In addition, the center points $(x_b4,y_b4)$, $(x_b5,y_b5)$, and $(x_b6,y_b6)$ of the cut-out images 350 to 370 at least satisfy the relationship of $x_b4>x_b5>x_b6$. In addition, the cut-out image 360 does not overlap the cut-out image 370, but the cut-out image 350 does overlap the cut-out image 360. Thus, the cut-out images 350 to 370 satisfy the restrictive conditions. The cut-out image generation unit 50 generates cut-out image information in which the cut-out images 350 to 370 are associated with the restrictive conditions that the cut-out images 350 to 370 satisfy, and then outputs the information to the effect image generation unit 40.

The effect image generation unit 40 decides the display regions corresponding to the cut-out images 350 to 370 based on the restrictive conditions that the cut-out images 350 to 370 satisfy. In the fourth example, the cut-out image 350 corresponds to the display region 1110. This is because the size and aspect ratio of the cut-out image 350 coincide with those of the display region 1110, and the position of the center point of the cut-out image 350 corresponds to the position of the center point of the display region 1110. In the same manner, the cut-out images 360 and 370 correspond to the display regions 1120 and 1130. Thus, the effect image generation unit 40 superimposes the cut-out image 350 over the display region 1110, superimposes the cut-out image 360 over the display region 1120, and superimposes the cut-out image 370 over the display region 1130. Accordingly, the effect image generation unit 40 generates an effect image shown in FIG. 21.

In the fourth example, since the positional relationship between the cut-out images in the input image coincides with the positional relationship between the cut-out images in the effect image, the effect image generation unit 40 can generate the effect image that does not give discomfort to users.

Figure 22:
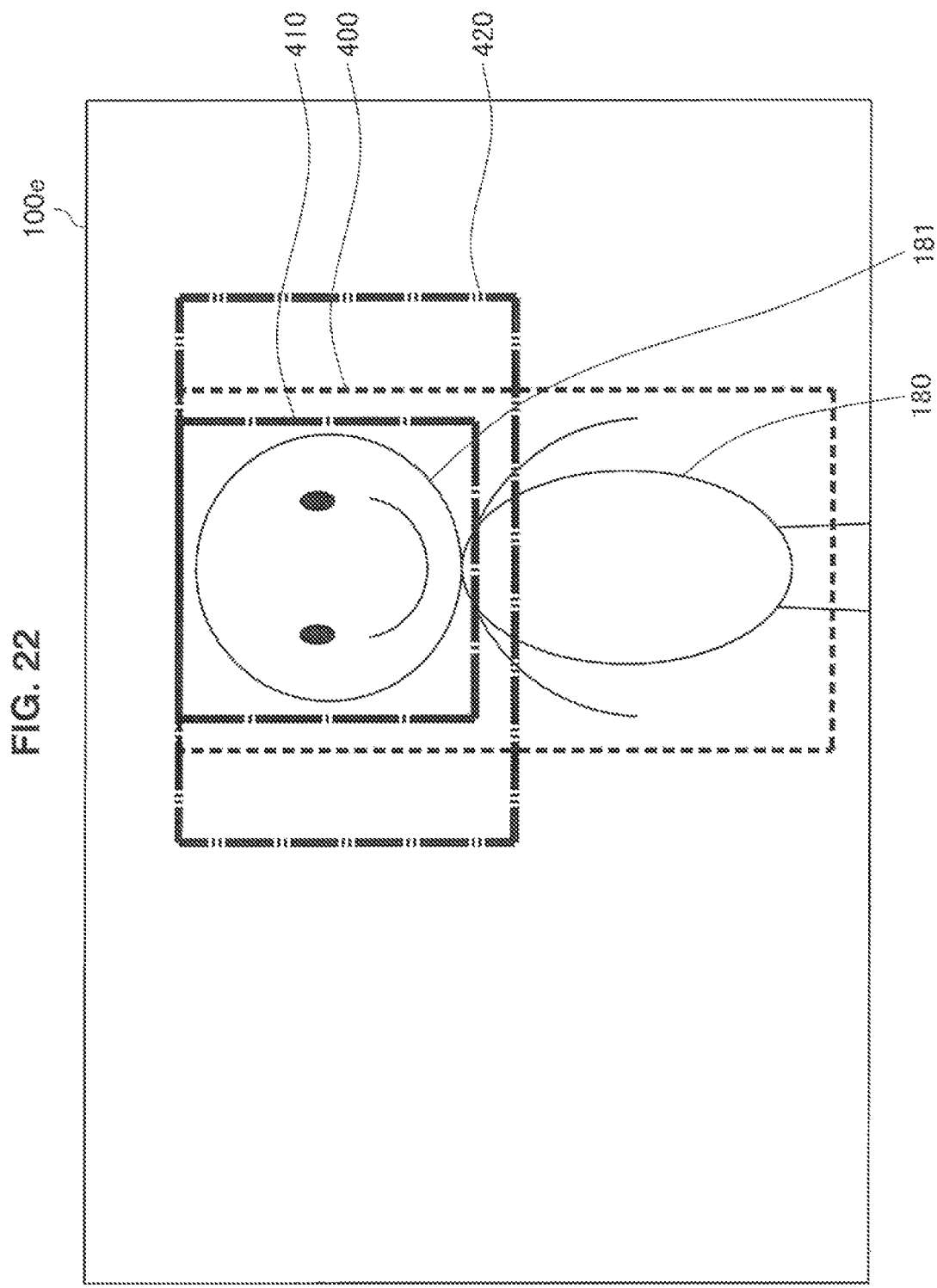
FIG. 22 is an illustrative diagram showing an example of image analysis.
Figure 23:
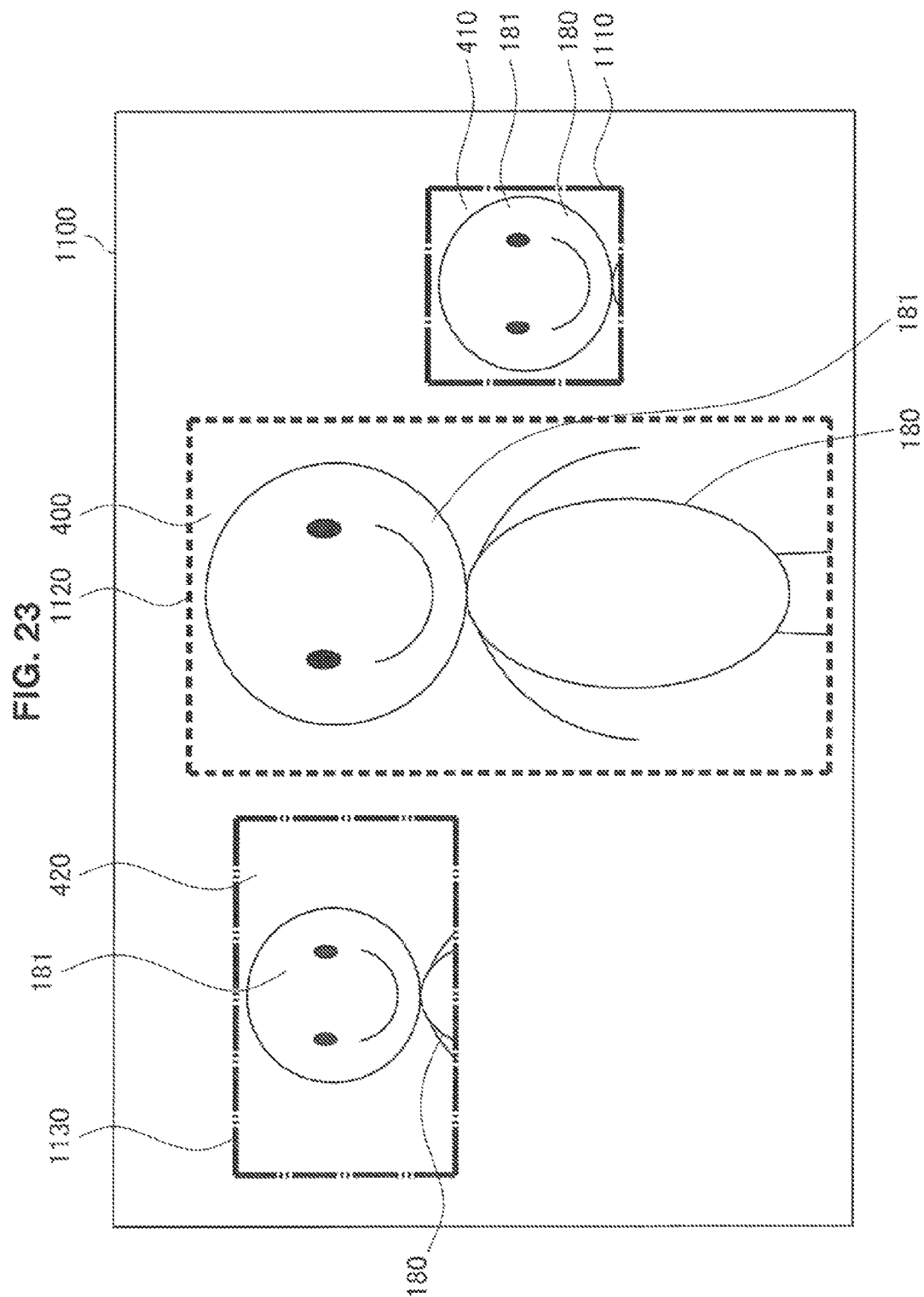
FIG. 23 is an illustrative diagram showing an example of an effect image.

Next, a fifth example will be described based on FIGS. 19, 22 and 23. In the fifth example, the effect image generation unit 40 generates the effect reference image 1100 shown in FIG. 19. The effect reference image 1100 includes the display regions 1110 to 1130.

Accordingly, the number of cut-out images is designated to be three. In addition, in this example, as restrictive conditions, the composition, aspect ratio, size, and zoom ratio of the cut-out images, and the presence or absence of overlap between the cut-out images are designated. The composition is assumed to be the rising-sun composition. The aspect ratio and size coincide with those of the display regions 1110 to 1130. In addition, it is assumed that the zoom ratio is designated to be about 1, and the presence of overlap between the cut-out images is designated. In addition, in this example, the cut-out image generation unit 50 acquires an input image 100e shown in FIG. 22 as an input image. In other words, in this example, there is only a person image 180 as a person image within the input image 100e. In other words, the number of persons is set to be fewer than the number of display regions.

The cut-out image generation unit 50 analyzes the input image 100e, and then detects a face image 181 of a person from the input image 100e. Then, the cut-out image generation unit 50 cuts cut-out images 400 to 420 from the input image 100e based on the above-described restrictive conditions.

Then, the face image 181 in the cut-out images 400 to 420 is all disposed near the centers of the cut-out images 400 to 420. In addition, the aspect ratios and sizes of the cut-out images 400 to 420 coincide with those of the display regions 1110 to 1130. In addition, the cut-out images 400 to 420 overlap. Thus, the cut-out images 400 to 420 satisfy the restrictive conditions. The cut-out image generation unit 50 generates cut-out image information in which the cut-out images 400 to 420 are associated with the restrictive conditions that the cut-out images 400 to 420 satisfy, and then outputs the information to the effect image generation unit 40.

The effect image generation unit 40 decides the display regions corresponding to the cut-out images 400 to 420 based on the restrictive conditions that the cut-out images 400 to 420 satisfy. In the fifth example, the cut-out image 400 corresponds to the display region 1120. This is because the size and aspect ratio of the cut-out image 400 coincide with those of the display region 1120. In the same manner, the cut-out images 410 and 420 correspond to the display regions 1110 and 1130. Thus, the effect image generation unit 40 superimposes the cut-out image 400 over the display region 1120, superimposes the cut-out image 410 over the display region 1110, and superimposes the cut-out image 420 over the display region 1130. Accordingly, the effect image generation unit 40 generates an effect image shown in FIG. 23.

In the fifth example, the effect image generation unit 40 can acquire a plurality of cut-out images having different ambience even when the number persons in an input image is fewer than the number of display regions, and thus, an effect image that looks attractive can be generated.

Figure 24:
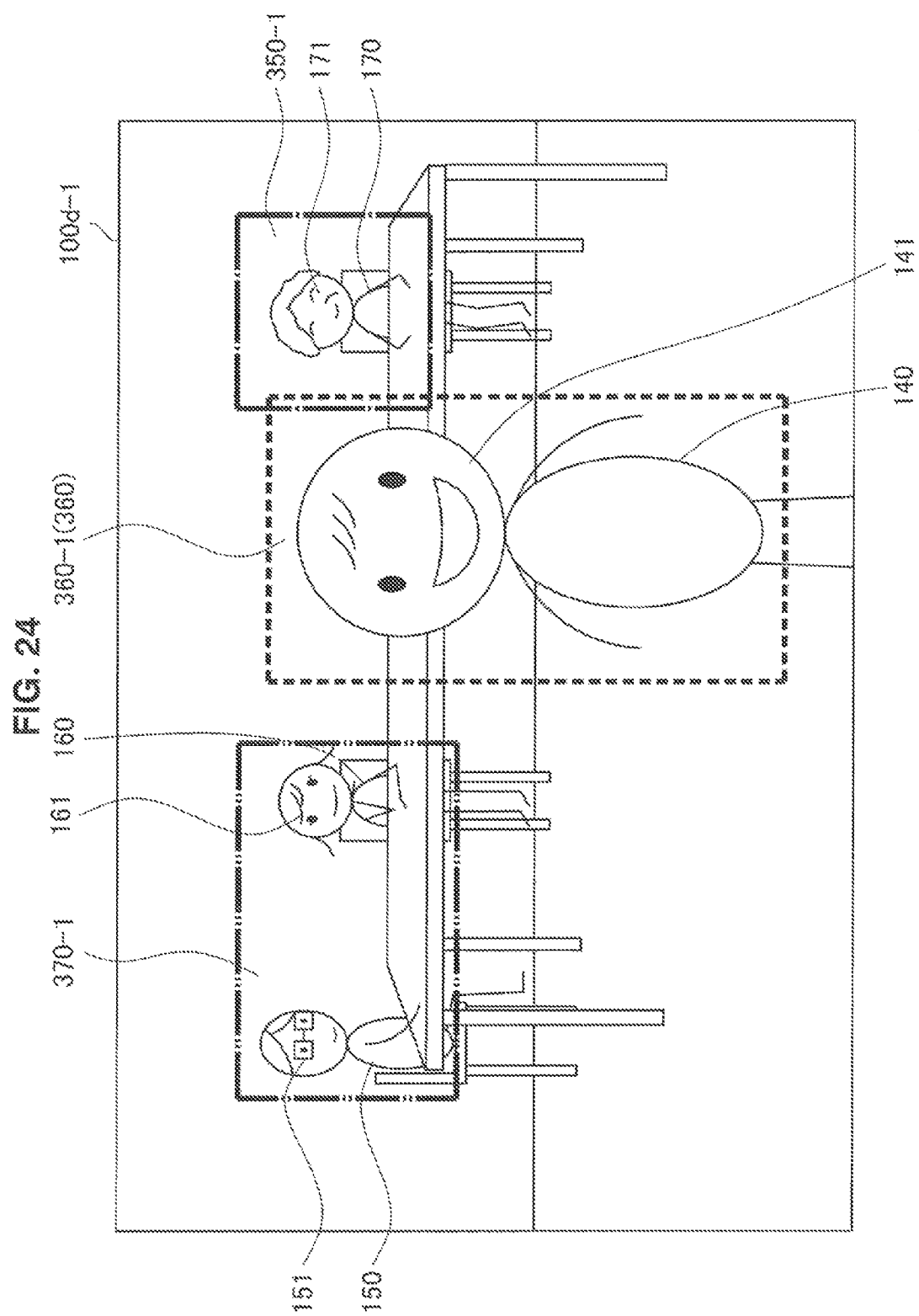
FIG. 24 is an illustrative diagram showing an example of an effect image.
Figure 25:
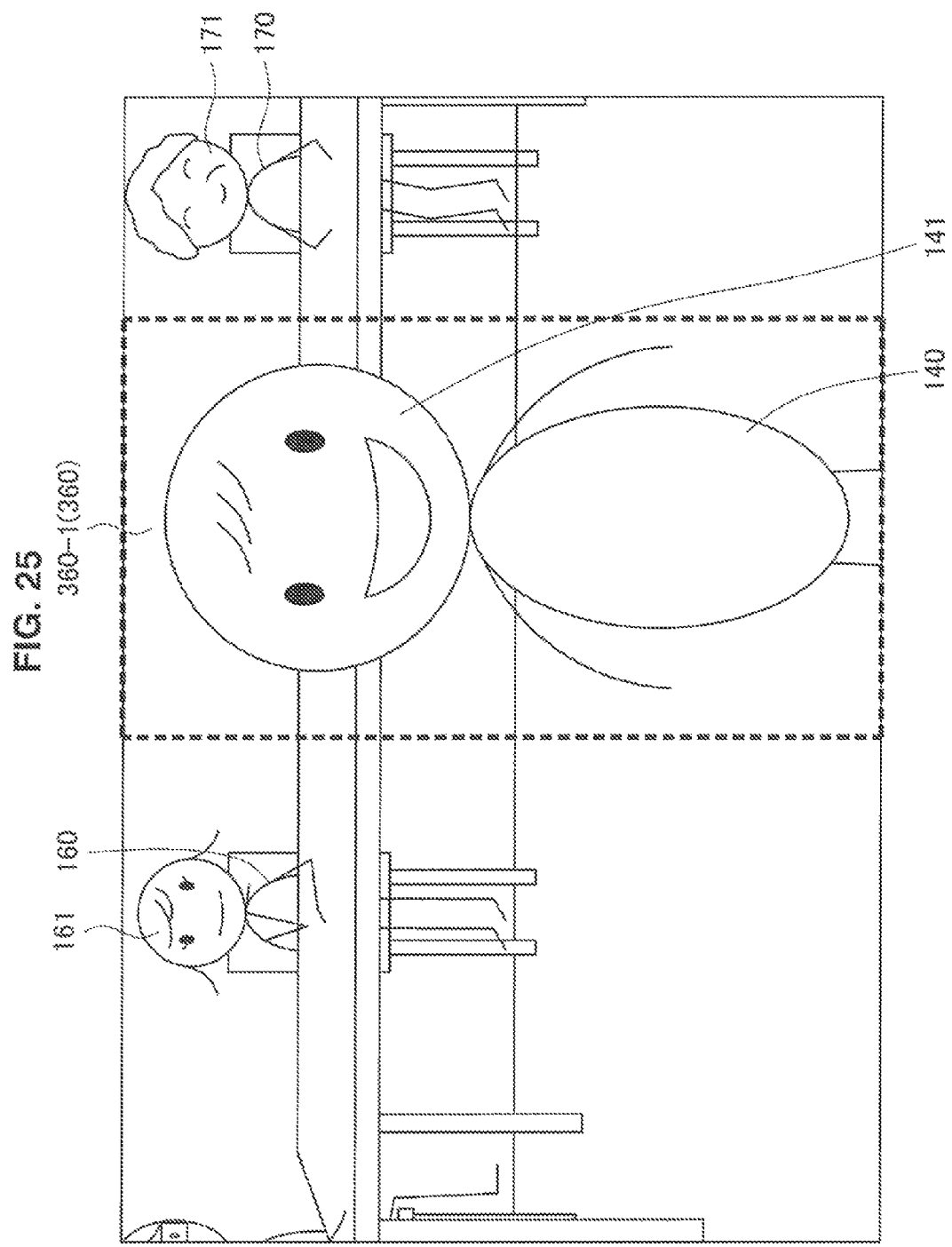
FIG. 25 is an illustrative diagram showing an example of an effect image.
Figure 26:
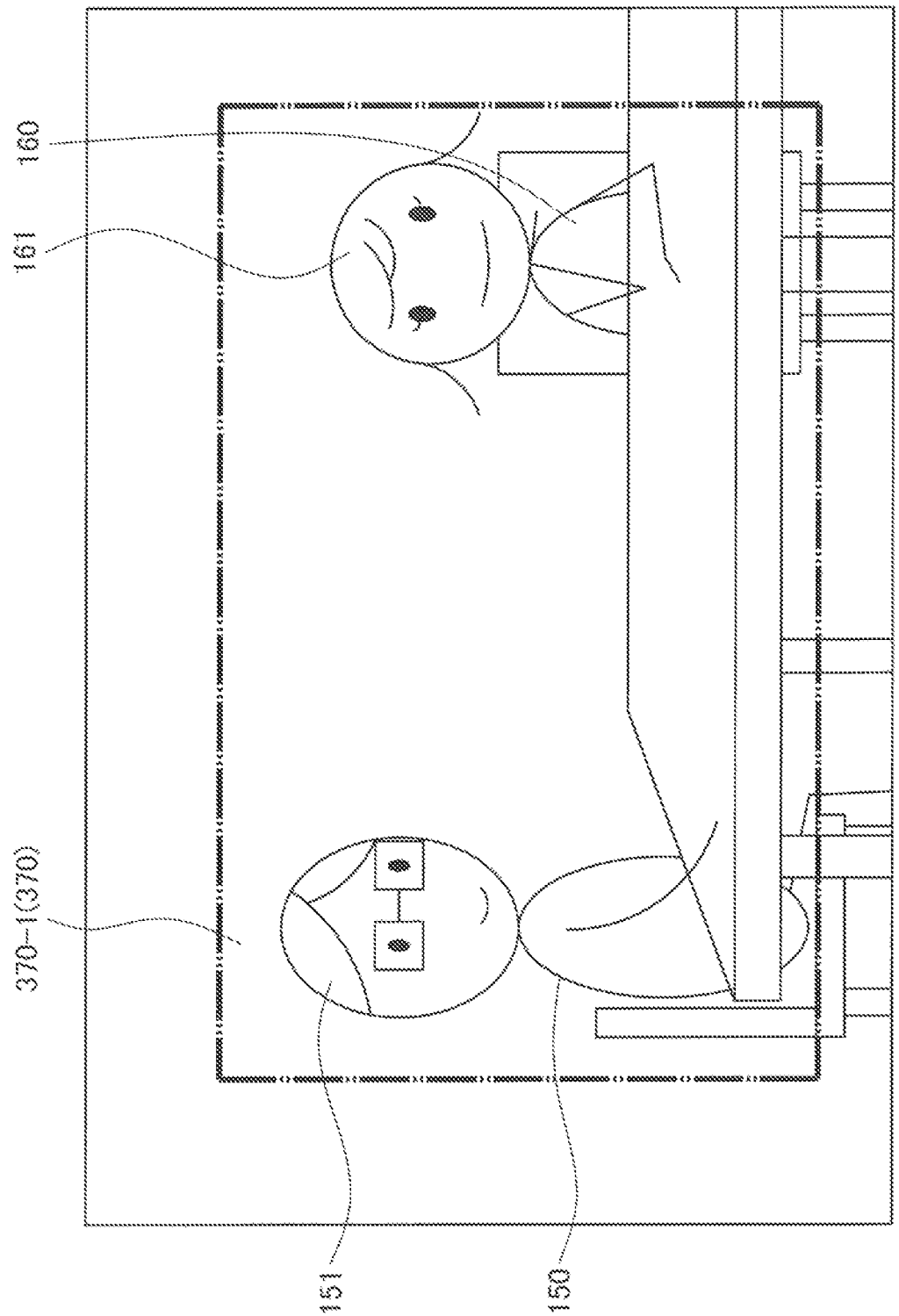
FIG. 26 is an illustrative diagram showing an example of an effect image.

Next, an example of a cut-out image that satisfies the first moving image condition will be described based on FIGS. 24 to 26. In this example, the effect image generation unit 40 sets an effect reference image that includes one display region. Thus, the number of cut-out images is designated to be one (one moving image). In addition, in this example, as restrictive conditions, the composition, aspect ratio, size, and zoom ratio of the cut-out image, and the presence or absence of overlap between cut-out images are designated. The composition is assumed to be designated to be the three-division composition. The aspect ratio and size coincide with those of the display region. In addition, it is assumed that the zoom ratio is designated to be around the above-described upper limit value, and the presence of overlap between cut-out images is designated. In addition, in this example, the cut-out image generation unit 50 acquires the input image 100d shown in FIG. 20 as an input image.

The cut-out image generation unit 50 analyzes the input image 100d, and then detects the face images 141 to 171 of the persons from the input image 100d. Then, the cut-out image generation unit 50 cuts target images 350-1 to 370-1 from the input image 100d based on the above-described restrictive conditions. The target images 350-1 to 370-1 satisfy the restrictive conditions, and correspond to the above-described cut-out images 350 to 370.

Then, the cut-out image generation unit 50 generates an initial image 100d-1 by adjusting the aspect ratio and size of the input image 100d to the aspect ratio and size of the display region. The adjusting method is not particularly limited. For example, the input image 100d may be zoomed in the x axis or y axis direction so that the aspect ratio of the input image 100d coincides with that of the display region. In addition, over the initial image 100d-1, frame images of the target image 350-1 to 370-1 may be superimposed. In addition, the cut-out image generation unit 50 may apply an effect (for example, gradation) to portions other than the target images 350-1 to 370-1.

Figure 28:
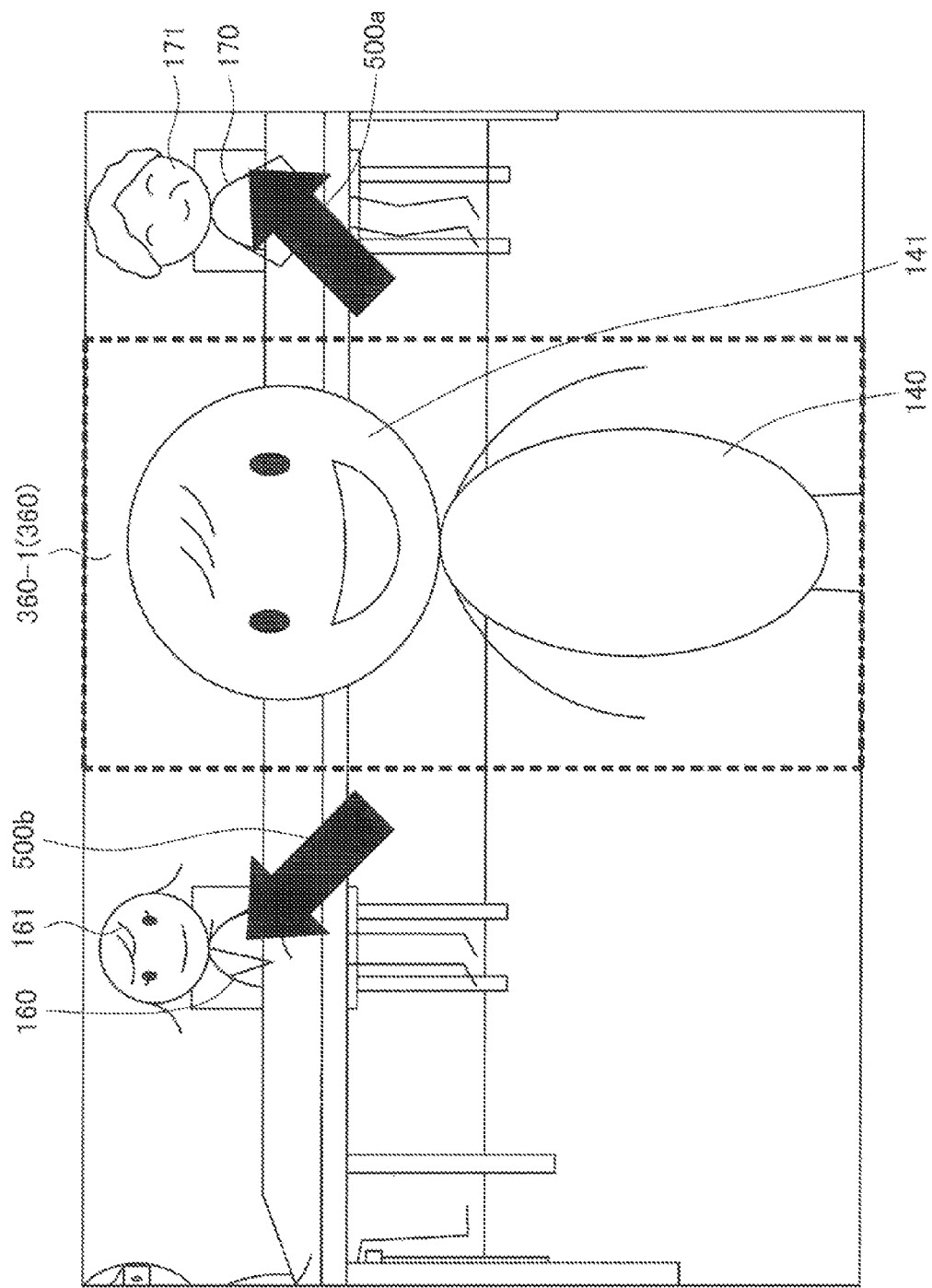
FIG. 28 is an illustrative diagram showing an example of an effect image.

Then, the cut-out image generation unit 50 generates a moving image in which the target image 360-1 is zoomed in from the initial image 100d-1, and zoomed out to the initial image 100d-1. This moving image is generated by superimposing still images having slightly different zoom ratios in a time series manner. In addition, the aspect ratio and size of the moving image satisfy the restrictive conditions. In addition, the zooming-in ends at least when the height of the target image 360-1 is equal to that of the initial image 100d-1 as shown in FIG. 28.

Figure 29:
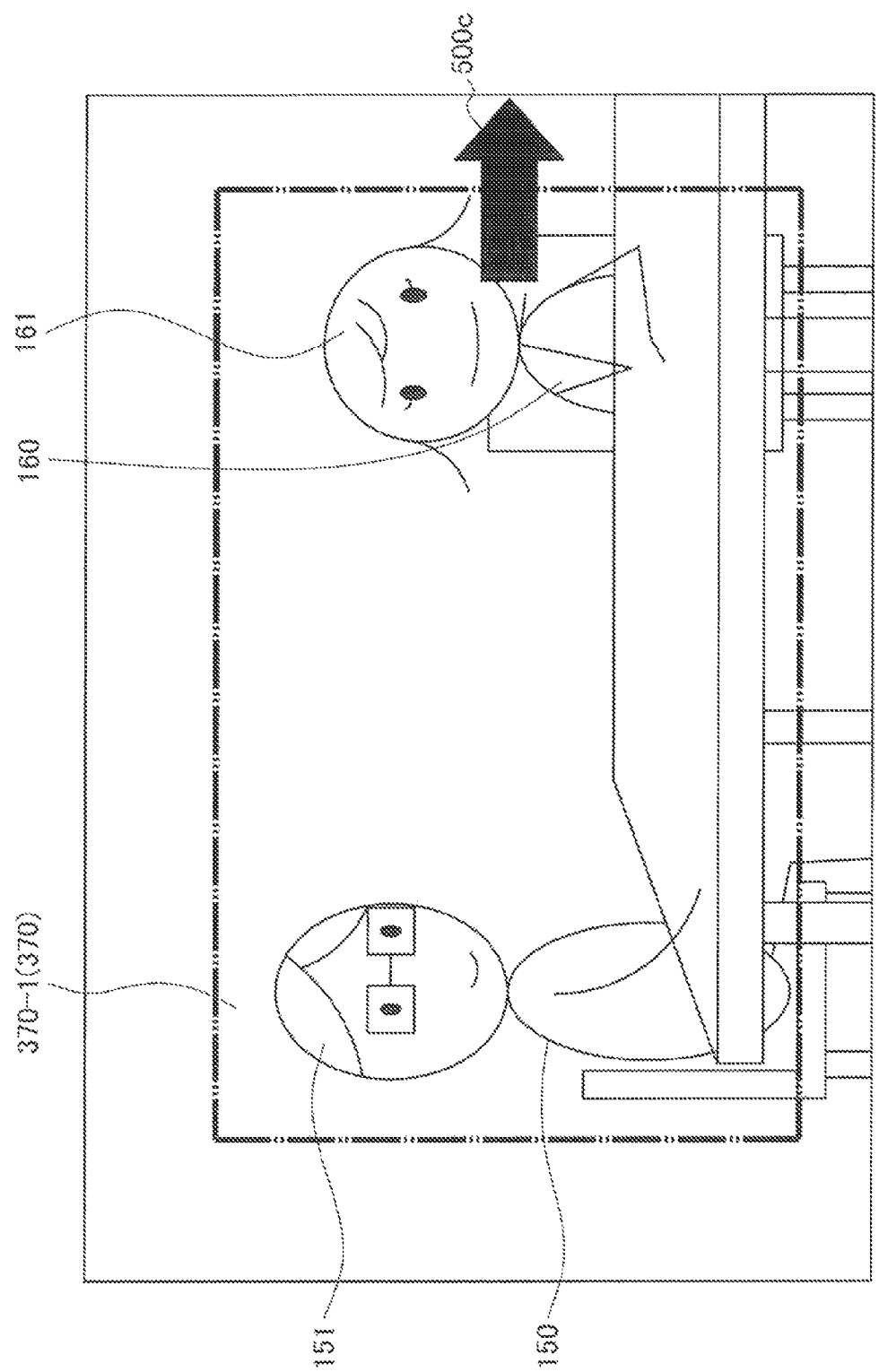
FIG. 29 is an illustrative diagram showing an example of an effect image.
Figure 30:
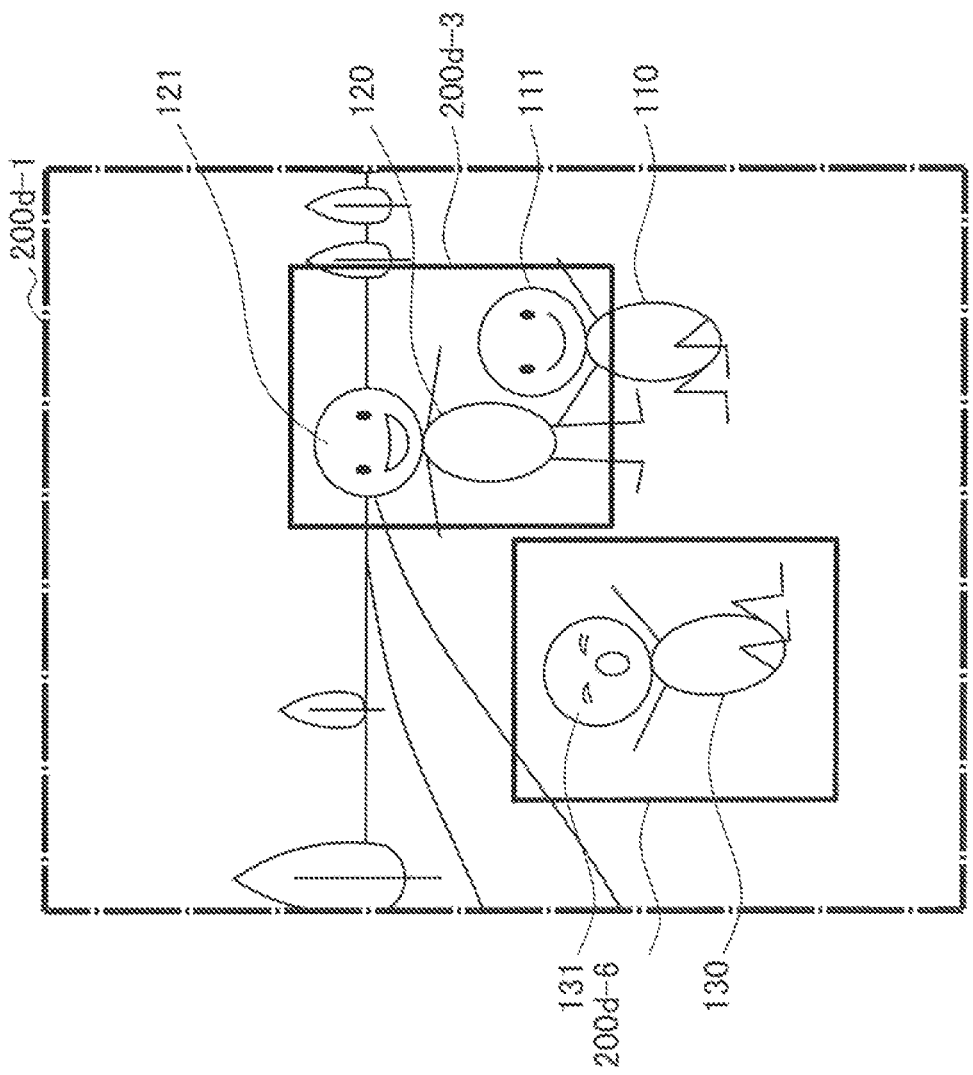
FIG. 30 is an illustrative diagram showing an example of an effect image.

In the same manner, the cut-out image generation unit 50 generates a moving image in which the target image 370-1 is zoomed in from the initial image 100d-1 and then zoomed out to the initial image 100d-1. An example of the image in which the target image 370-1 is zoomed in is shown in FIG. 29.

In the same manner, the cut-out image generation unit 50 generates a moving image in which the target image 350-1 is zoomed in from the initial image 100d-1 and then zoomed out to the initial image 100d-1. By combining the initial image 100d-1 and the moving images, the cut-out image generation unit 50 generates a first moving image, that is, a cut-out image. Then, the cut-out image generation unit 50 generates cut-out image information in which the cut-out image is associated with the restrictive conditions that the cut-out image satisfies. Then, the cut-out image generation unit 50 outputs the cut-out image information to the effect image generation unit 40. Note that the cut-out image generation unit 50 may generate a moving image in which any target image is zoomed in on, and then the focus moves to another target image while maintaining the zoom ratio as a cut-out image.

The effect image generation unit 40 generates an effect image by superimposing the cut-out image on the effect reference image. This effect image is assumed to be obtained by reproducing the above-described moving image on the effect reference image. Thus, the effect image generation unit 40 can generate an effect image that looks attractive from one input image.

Figure 27:
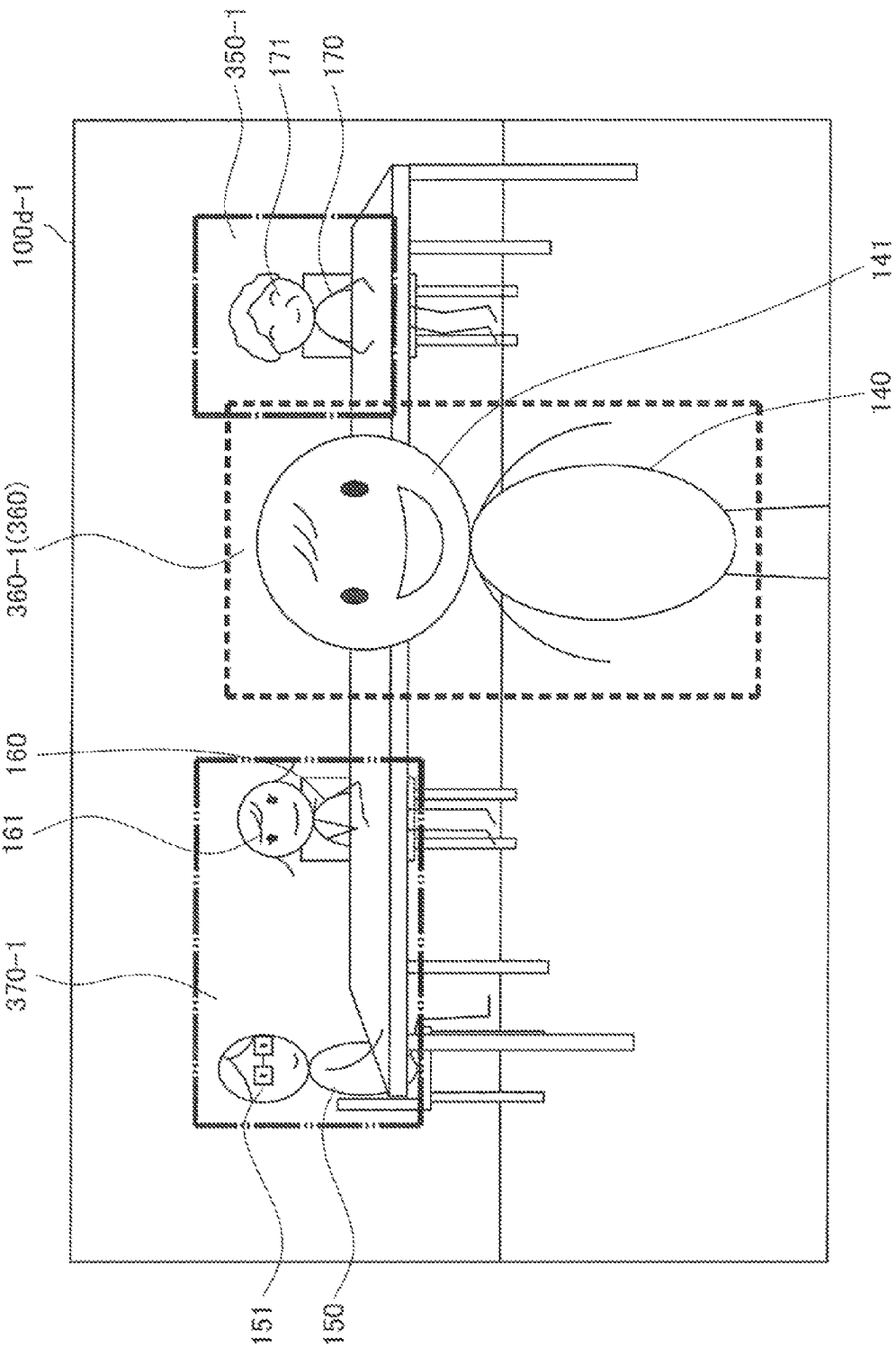
FIG. 27 is an illustrative diagram showing an example of an effect image.

Note that the effect image generation unit 40 may display the cut-out image as is, but also can perform interactive display. An example thereof is shown in FIGS. 27 to 29. In this example, the effect image generation unit 40 first displays the initial image 100d-1 as shown in FIG. 27. Then, the effect image generation unit 40 displays a moving image in which the target image 360-1 is zoomed in on. Then, the effect image generation unit 40 displays arrow images 500a and 500b indicating the locations of other target images 350-1 and 370-1 as shown in FIG. 28 when the zooming-in ends. With regard to this, a user selects either of the arrow image 500a or 500b using an input operation unit (for example, a mouse). Then, the effect image generation unit 40 displays a moving image in which the focus is zoomed out to the initial image 100d-1. Then, the effect image generation unit 40 displays a moving image in which a target image that the user selects is zoomed in on. When the user selects the target image 370-1, for example, the effect image generation unit 40 displays a moving image in which the target image 370-1 is zoomed in on. Then, the effect image generation unit 40 displays an arrow image 500c indicating the location of other target images 350-1 and 360-1 as shown in FIG. 29 when the zooming-in ends. Then, the effect image generation unit 40 repeats the same process.

Next, an example of a cut-out image that satisfies the second moving image condition will be described based on FIGS. 30 to 35. In this example, the effect image generation unit 40 sets an effect reference image that includes one display region. Thus, the number of cut-out images is designated to be one (one moving image). In addition, in this example, as restrictive conditions, the composition, aspect ratio, size, and zoom ratio of the cut-out image, and the presence or absence of overlap between cut-out images are designated. The composition is assumed to be designated to be the three-division composition. The aspect ratio and size coincide with those of the display region. In addition, it is assumed that the zoom ratio is designated to be around 1 to the above-described upper limit value, and the presence of overlap between cut-out images is designated. In addition, in this example, the cut-out image generation unit 50 acquires the input image 100b shown in FIG. 9 as an input image.

The cut-out image generation unit 50 analyzes the input image 100b, and then detects the face images 111 to 131 of the persons from the input image 100b. Then, the cut-out image generation unit 50 cuts target images 200d-3 and 200d-6 from the input image 100b based on the above-described restrictive conditions. The target images 200d-3 and 200d-6 satisfy the restrictive conditions. Furthermore, the target image 200d-6 includes the subject in the direction of sight of the face images 111 and 121 of the persons, that is, the face image 131 of the person.

Then, the cut-out image generation unit 50 generates an initial image 200d-1 by adjusting the aspect ratio and size of the input image 100b to the aspect ratio and size of the display region. The adjusting method is not particularly limited. For example, the input image 100b may be zoomed in the x axis or y axis direction so that the aspect ratio of the input image 100b coincides with that of the display region.

Figure 31:
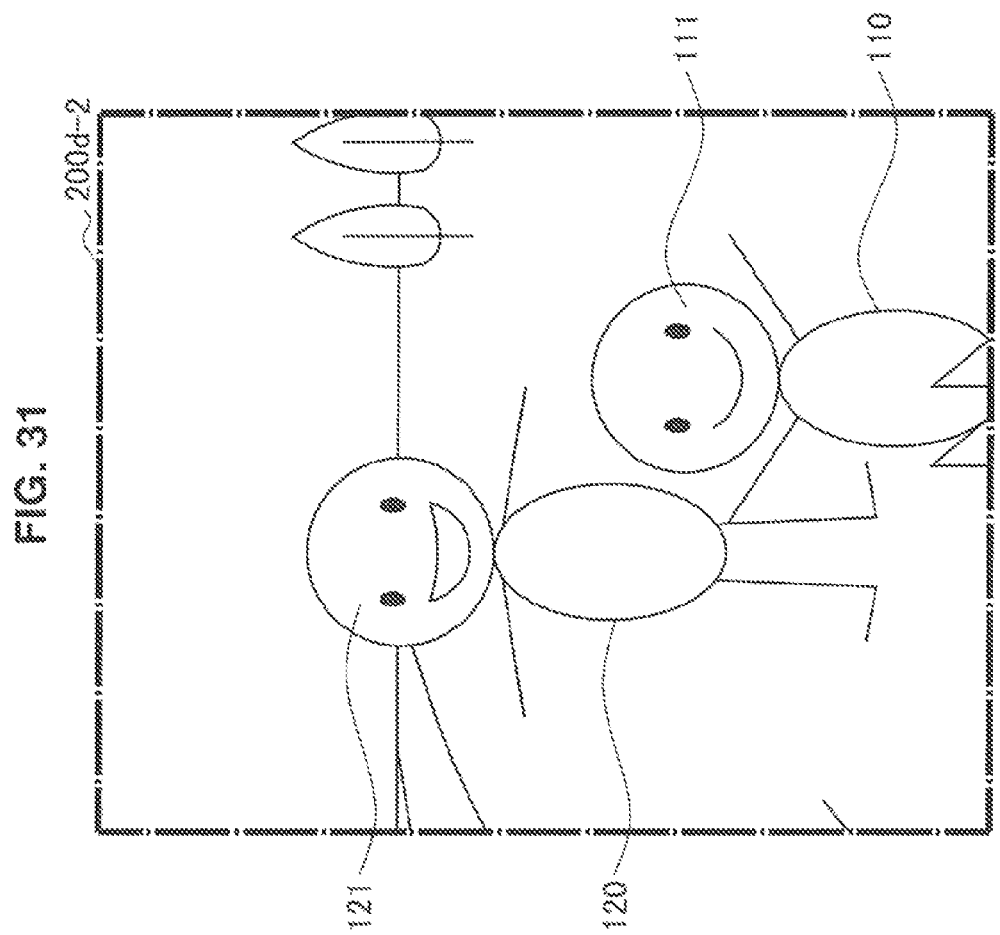
FIG. 31 is an illustrative diagram showing an example of an effect image.
Figure 32:
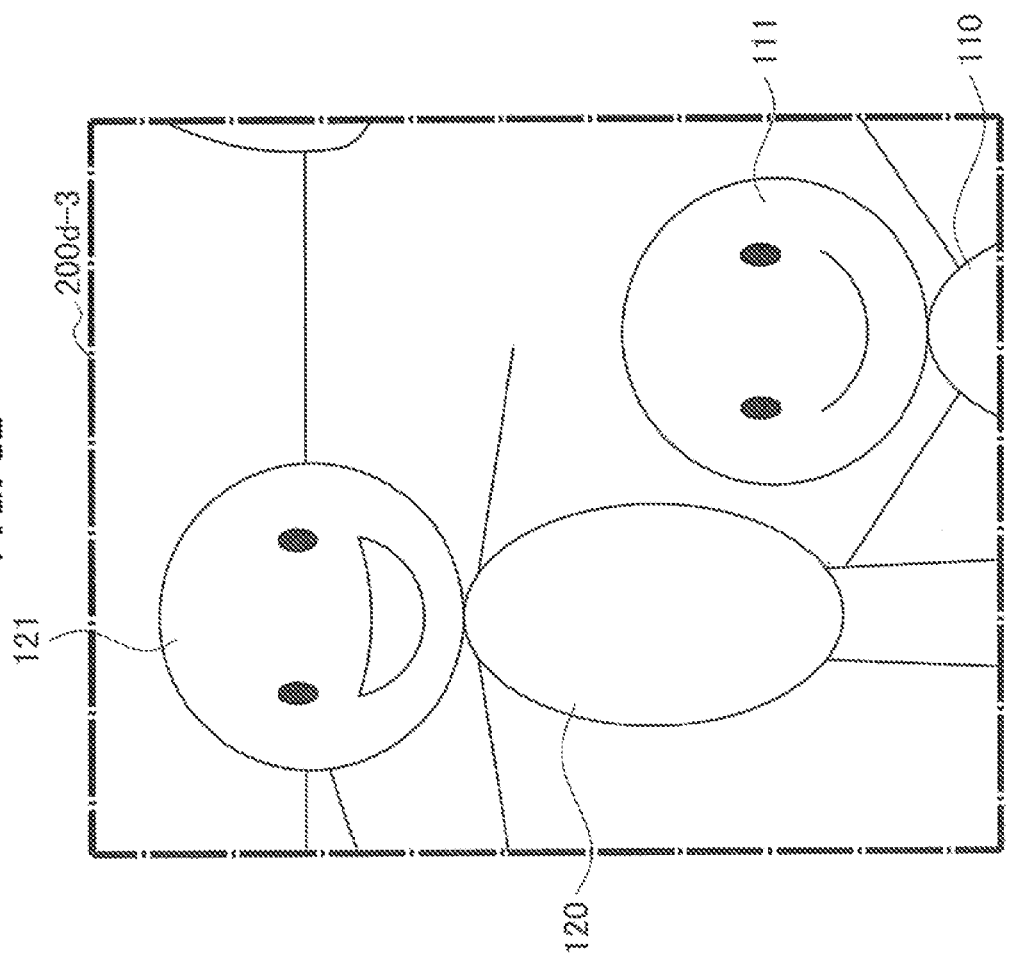
FIG. 32 is an illustrative diagram showing an example of an effect image.

Then, the cut-out image generation unit 50 generates a moving image in which the target image 200d-3 is zoomed in from the initial image 200d-1. The aspect ratio and size of this moving image satisfy the restrictive conditions. In addition, this moving image is generated by superimposing still images having slightly different zoom ratios in a time series manner. In addition, the zooming-in ends when the target image 200d-3 forms a whole cut-out image. FIG. 31 shows an image displayed in the middle of the moving image, and FIG. 32 shows the image at the time when the zooming-in ends.

Figure 33:
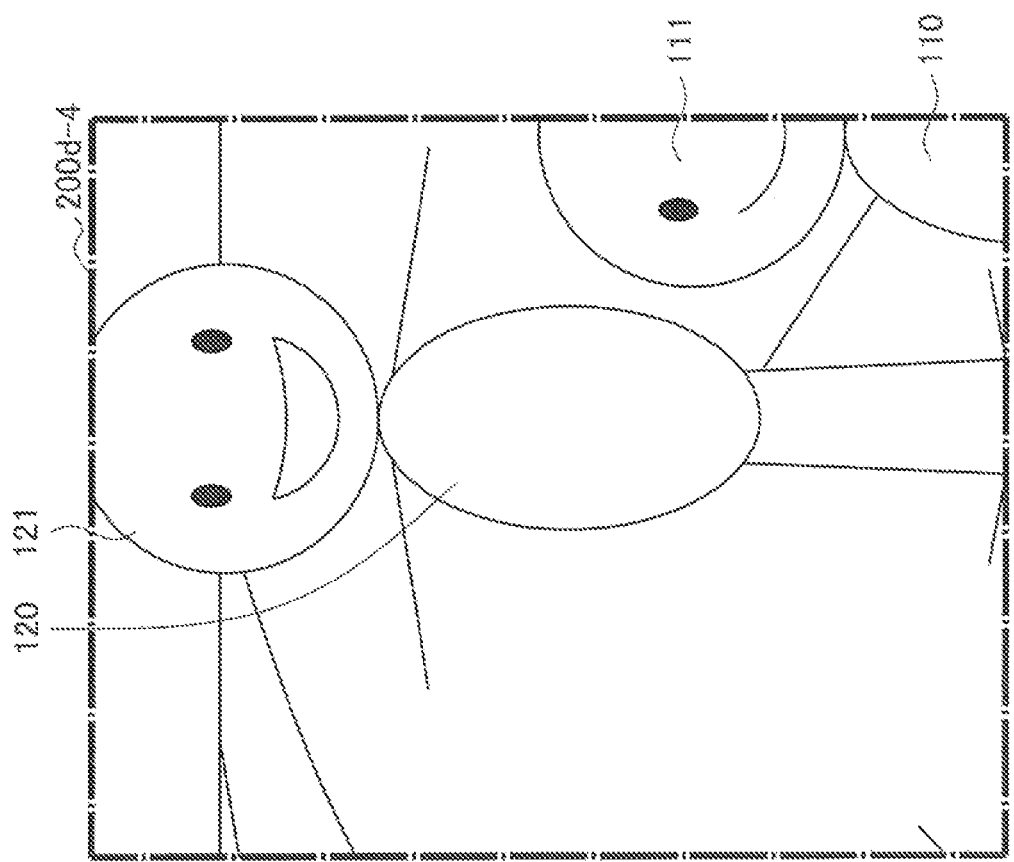
FIG. 33 is an illustrative diagram showing an example of an effect image.
Figure 34:
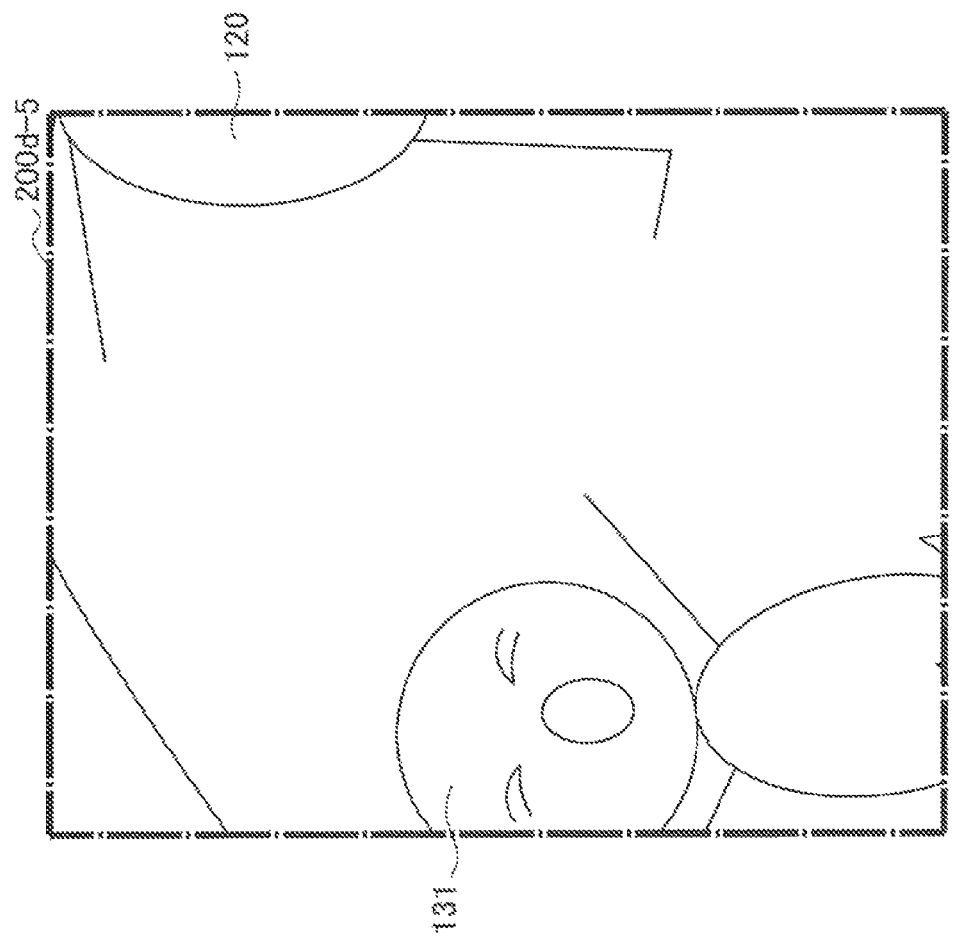
FIG. 34 is an illustrative diagram showing another example of the effect image.
Figure 35:
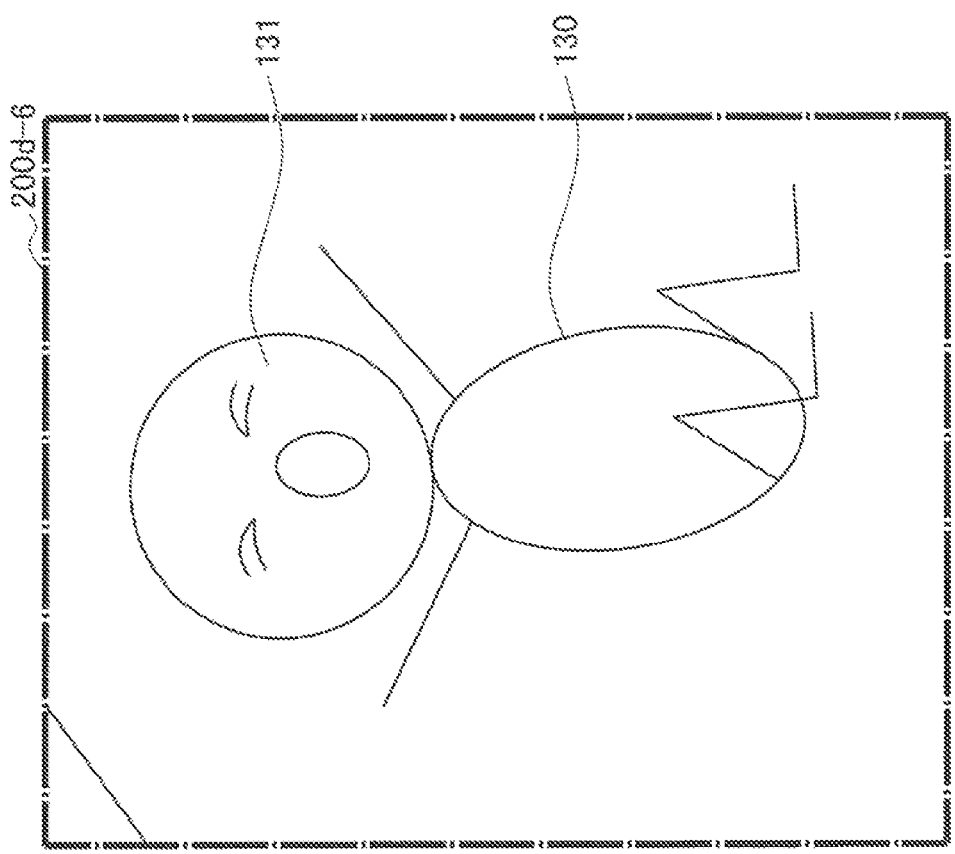
FIG. 35 is an illustrative diagram showing an example of an effect image.

Then, the cut-out image generation unit 50 generates a moving image in which regions from the face images 111 and 121 of the persons to the face image 131 in the direction of sight of the face images 111 and 121 are sequentially displayed. This moving image ends when the target image 200d-6 forms a whole cut-out image. FIGS. 33 and 34 show images displayed in the middle of the moving image, and FIG. 35 shows the image at the time when the moving image ends. Thus, the cut-out image generation unit 50 can generate a moving image as if a video camera pans for the image.

By combining the initial image 200d-1 and the moving images, the cut-out image generation unit 50 generates a second image, that is, a cut-out image, and generates cut-out image information in which the cut-out image is associated with the restrictive conditions that the cut-out image satisfies. Then, the cut-out image generation unit 50 outputs the cut-out image information to the effect image generation unit 40.

The effect image generation unit 40 generates an effect image by superimposing the cut-out image on the effect reference image. The effect image is assumed to be obtained by reproducing the above-described moving image on the effect reference image. Thus, the effect image generation unit 40 can generate an effect image that looks attractive from one input image. Note that the cut-out image generation unit 50 may generate divided cut-out images by dividing the regions from the face images of the persons to the subject in the direction of sight into a plural number, and provide the image to the effect image generation unit 40. In this case, the effect image generation unit 40 sets a plurality of display regions. Then, the effect image generation unit 40 superimposes each of the divided cut-out image on the display regions so that the positional relationship between the display regions coincides with the positional relationship between the divided cut-out images. Also in this case, the effect image generation unit can generate an effect image that looks attractive.

Figure 13:
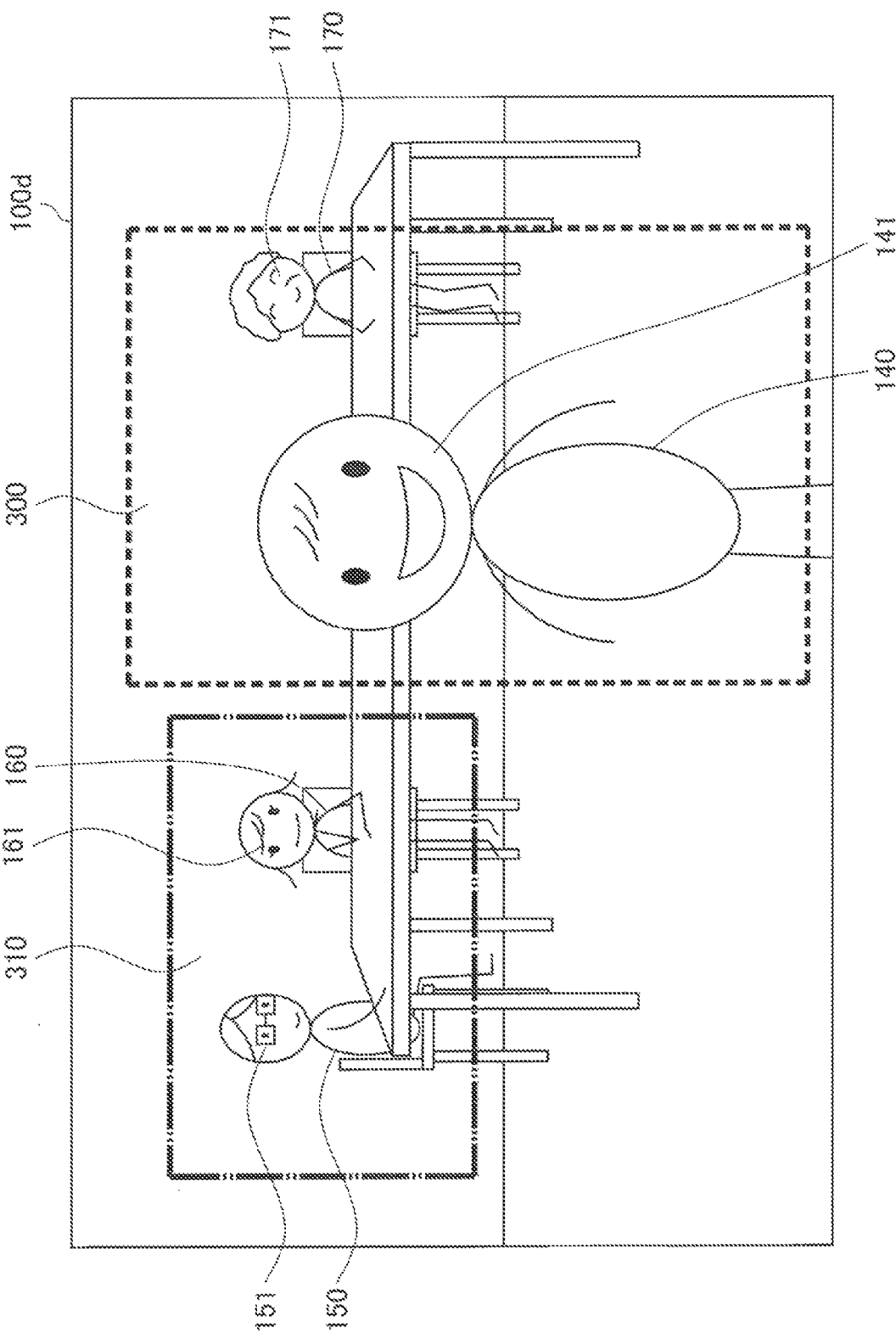
FIG. 13 is an illustrative diagram showing an example of image analysis.
Figure 14:
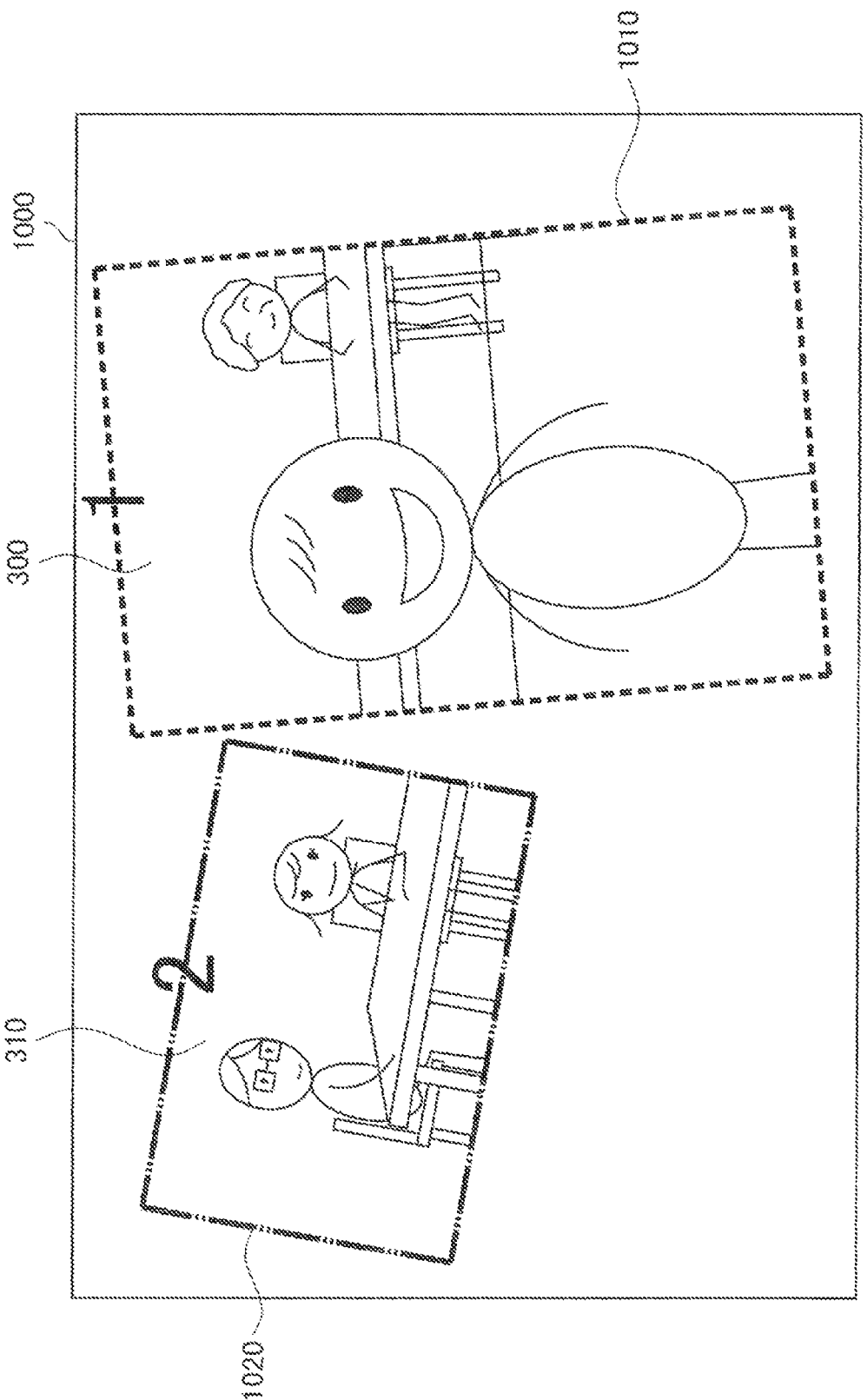
FIG. 14 is an illustrative diagram showing an example of an effect image.

On the other hand, when a second cut-out image generation process is performed, the effect image generation unit 40 does not generate the effect reference image in advance. Thus, the effect image generation unit 40 generates the effect reference image according to the restrictive condition that the cut-out image satisfies when the cut-out image information is given. When the cut-out images 300 and 310 shown in FIG. 13 are given, for example, the effect image generation unit 40 generates the effect reference image 1000, and superimposes the cut-out images 300 and 310 on the effect reference image 1000.

In other words, in this example, the effect image generation unit 40 generates the display regions 1010 and 1020 having the same aspect ratios and sizes as the cut-out images 300 and 310. Then, the effect image generation unit 40 generates the effect reference image 1000 by disposing the display regions 1010 and 1020 on a base image (an image obtained by removing the display regions from the effect reference image). Herein, the effect image generation unit 40 disposes the display region 1010 further on the right side than the display region 1020 so that the positional relationship between the cut-out images 300 and 310 is the same as that between the display regions 1010 and 1020.

Note that, when the number of cut-out images is included in the restrictive condition, and the number of cut-out images is two or more in each example described above, the cut-out image generation unit 50 cuts a plurality of cut-out images from one input image. However, the cutting method is not limited hereto, and the cut-out image generation unit 50 may cut cut-out images from each of a plurality of input images.

Figure 36:
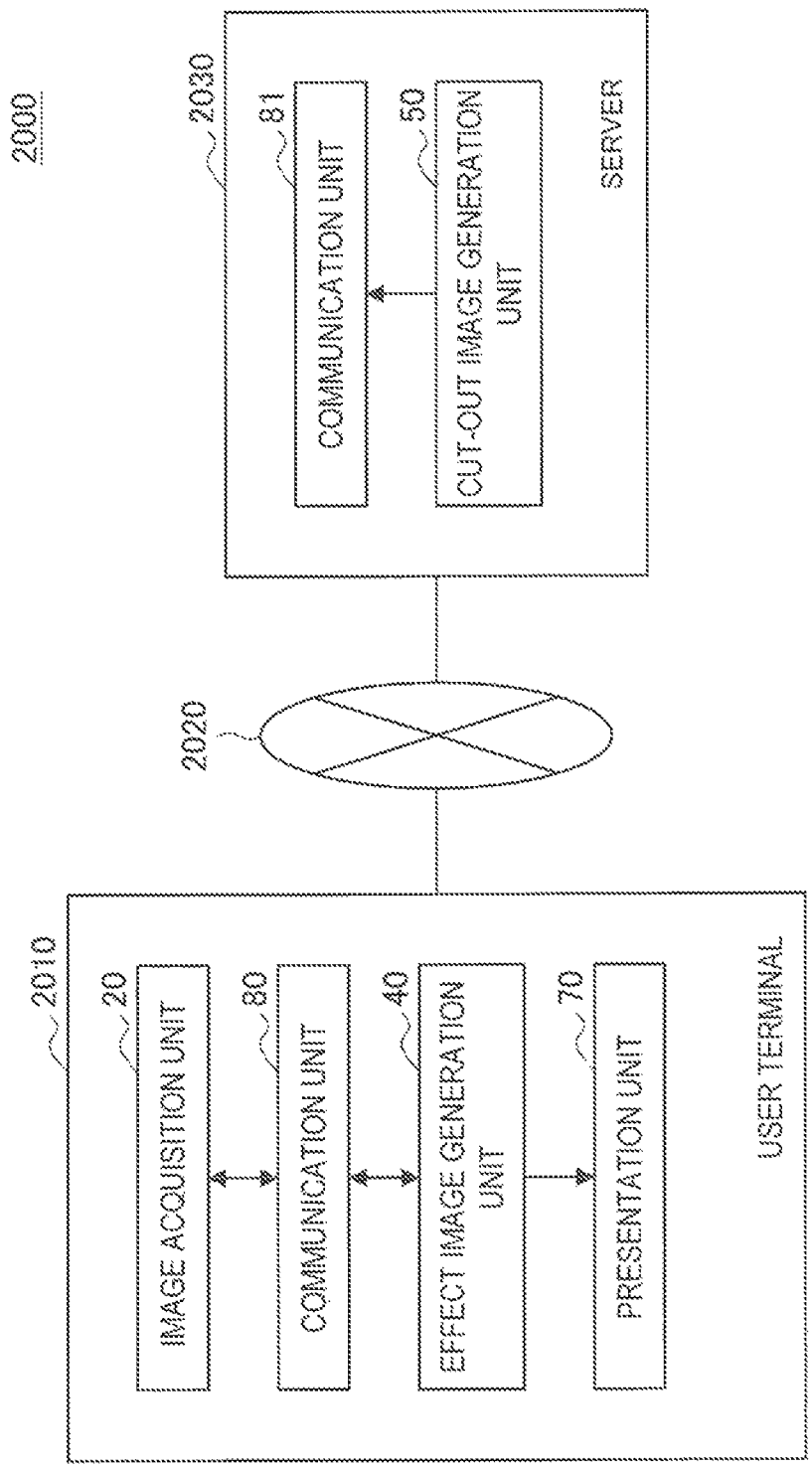
FIG. 36 is a block diagram showing a configuration of an image processing system according to a modification example of the first embodiment.

In addition, the image processing device 10 may be a server connected to a user terminal via a network. In this case, the image processing device 10 may not have the presentation unit. In addition, the image acquisition unit 20 acquires an input image from such a user terminal via a network. In addition, the image processing device 10 generates a plurality of effect images by performing the above-described processes, and provides the images to the user terminal In addition, some functions of the image processing device 10 may be provided in a server. As an example thereof, FIG. 36 shows an image processing network 2000. In the image processing network 2000, a user terminal 2010 is provided with the image acquisition unit 20, the effect image generation unit 40, and the presentation unit 70. On the other hand, a server 2030 is provided with the cut-out image generation unit 50, and a communication unit 81. The user terminal 2010 and the server 2030 are connected to each other via a communication network 2020.

In this image processing network 2000, the image acquisition unit 20 of the user terminal 2010 acquires an input image and then outputs the image to a communication unit 80. The communication unit 80 transmits the input image to the server 2030 via the communication network 2020. The communication unit 81 of the server 2030 receives the input image, and outputs the image to the cut-out image generation unit 50. The cut-out image generation unit 50 generates cut-out image information by performing the above-described processes, and outputs the information to the communication unit 81. The communication unit 81 transmits the cut-out image information to the user terminal 2010 via the communication network 2020. The communication unit 80 of the user terminal 2010 receives the cut-out image information, and then outputs the information to the effect image generation unit 40. The effect image generation unit 40 generates a plurality of effect images based on the cut-out image information, and then sequentially displays the images in the presentation unit 70. This process corresponds to the first cut-out image generation process described above.

On the other hand, the cut-out image generation unit 50 may arbitrarily generate a cut-out image, generate cut-out image information in which the cut-out image is associated with the restrictive conditions that the cut-out image satisfies, and then output the information to the communication unit 81. In this case, the communication unit 81 transmits the cut-out image information to the user terminal 2010 via the communication network 2020. The communication unit 80 of the user terminal 2010 receives the cut-out image information, and outputs the information to the effect image generation unit 40. The effect image generation unit 40 generates an effect reference image according to the restrictive conditions that the cut-out image satisfies. Then, the effect image generation unit 40 generates an effect image by superimposing the effect reference image on the cut-out image. This process corresponds to the above-described second cut-out image generation process.

In addition, the image processing device 10 generates effect images, in other words, a slide show, but may edit input images. In this case, the image processing device 10 has an image editing unit instead of the effect image generation unit 40. This image editing unit sets restrictive conditions based on input operations from a user, and outputs restrictive condition information to the cut-out image generation unit 50. The cut-out image generation unit 50 cuts cut-out images satisfying the restrictive conditions from the input images, and generates cut-out image information in which the cut-out images are associated with the restrictive conditions that the cut-out images satisfy. Then, the cut-out image generation unit 50 outputs cut-out image information to the image editing unit. The image editing unit displays the cut-out image information on the presentation unit 70. Accordingly, a user can view the cut-out images for which desired cutting-out has been performed. In addition, the user may input more restrictive conditions for the cut-out images. In this case, the same process is performed for the cut-out images.

<1-3. Procedure of Process Executed by Image Processing Device>

Figure 2:
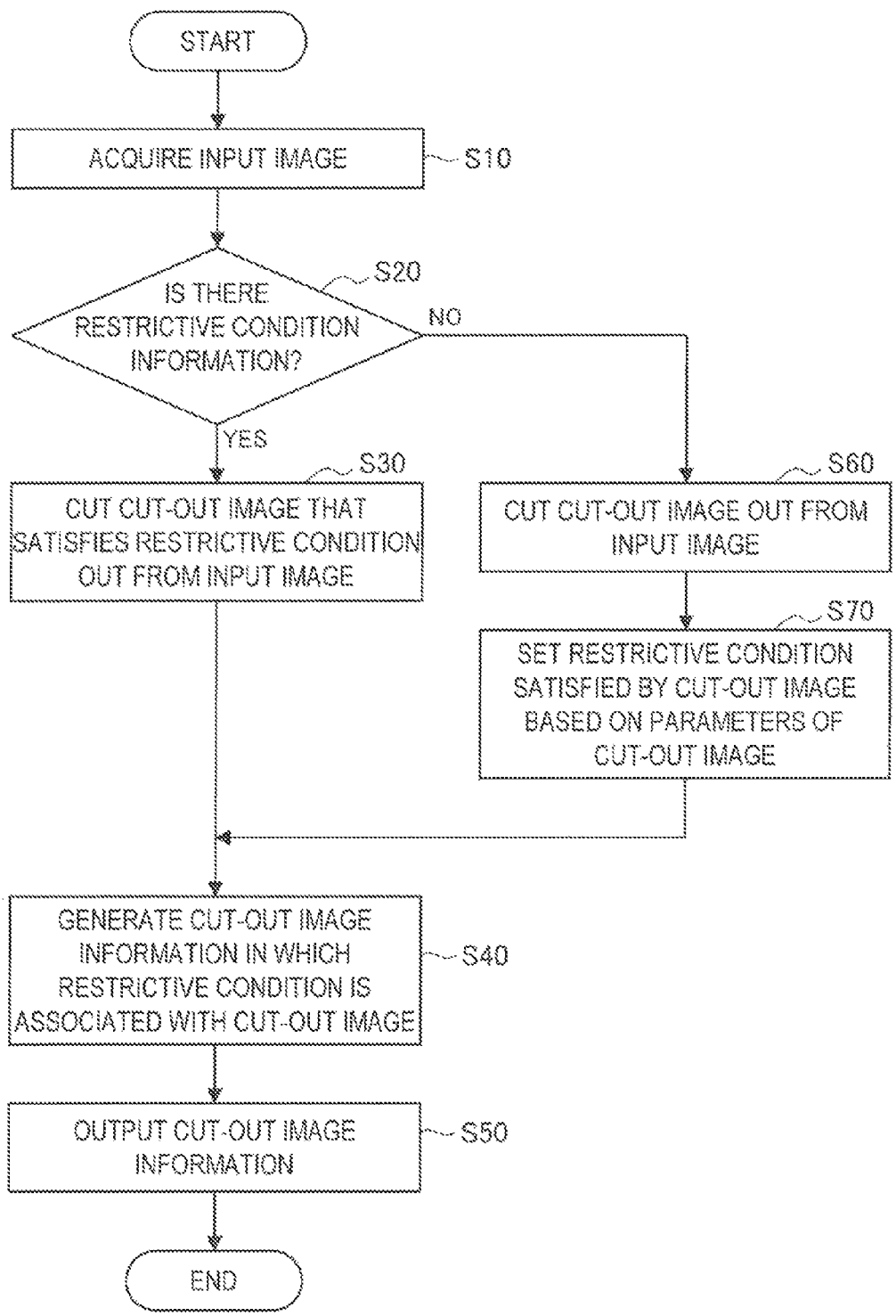
FIG. 2 is a flowchart showing the procedure of a process performed by the image processing device according to the embodiment.

Next, the procedure of a process executed by the image processing device 10 will be described based on the flowchart shown in FIG. 2. In Step S10, the image acquisition unit 20 acquires an input image, and then outputs the image to the cut-out image generation unit 50.

In Step S20, the cut-out image generation unit 50 determines whether or not restrictive condition information is given. When the restrictive condition information is determined to be given, the process of the cut-out image generation unit 50 proceeds to Step S30, and when the restrictive condition information is determined not to be given, the process proceeds to Step S60.

In Step S30, the cut-out image generation unit 50 generates cut-out images satisfying restrictive conditions based on the restrictive condition information. In Step S40, the cut-out image generation unit 50 generates cut-out image information in which the cut-out images are associated with the restrictive conditions that the cut-out images satisfy. In Step S50, the cut-out image generation unit 50 outputs the cut-out image information to the effect image generation unit 40. The effect image generation unit 40 generates effect images based on the cut-out image information, and then sequentially displays them on the presentation unit 70. Then, the image processing device 10 finishes the process.

On the other hand, in Step S60, the cut-out image generation unit 50 arbitrarily cuts cut-out images from the input image. In Step S70, the cut-out image generation unit 50 sets restrictive conditions that the cut-out images satisfy based on parameters of the cut-out images. Then, the process of the cut-out image generation unit 50 proceeds to Step S40.

Accordingly, the cut-out image generation unit 50 analyzes the input image, cuts the cut-out images from the input image based on the analysis result of the input image, and then generates cut-out image information in which the cut-out images are associated with the restrictive conditions that the cut-out images satisfy. Thus, the image processing device 10 can generate the restrictive conditions that the cut-out images satisfy. Furthermore, since the effect image generation unit 40 of the image processing device 10 can generate effect images using the cut-out images, the effect images that look attractive can thereby be generated.

Furthermore, the cut-out image generation unit 50 cuts the cut-out images from the input image based on the restrictive condition information given from the effect image generation unit 40. Thus, the effect image generation unit 40 can easily acquire desired cut-out images.

Furthermore, the cut-out image generation unit 50 cuts the cut-out images from the input image, and sets the restrictive conditions that the cut-out image satisfy based on parameters of the cut-out images. Thus, the effect image generation unit 40 can acquire the cut-out images generated under any restrictive conditions even though the unit does not set the restrictive conditions by itself.

Furthermore, the restrictive conditions include at least one of the compositions of the cut-out images, the aspect ratios of the cut-out images, the sizes of the cut-out images, the positions of the cut-out images, the zoom ratios of the cut-out images, the number of cut-out images, and the presence or absence of overlap between the cut-out images. Thus, the cut-out image generation unit 50 can generate various cut-out images. Furthermore, the effect image generation unit 40 can pad the input image by setting the number of cut-out images to be a plural number. Thus, the effect image generation unit 40 can lower the possibility of the input images being insufficient. For example, the effect image generation unit 40 may increase the number of cut-out images as the length of music reproduced with a slide show becomes longer.

Furthermore, since the restrictive conditions include at least one of the first moving image condition and the second moving image condition, the cut-out image generation unit 50 can generate the first moving image and the second moving image.

<2. Second Embodiment>

Next, a second embodiment will be described. The second embodiment displays an enlarged subject, and the like according to an input operation by a user.

Figure 37:
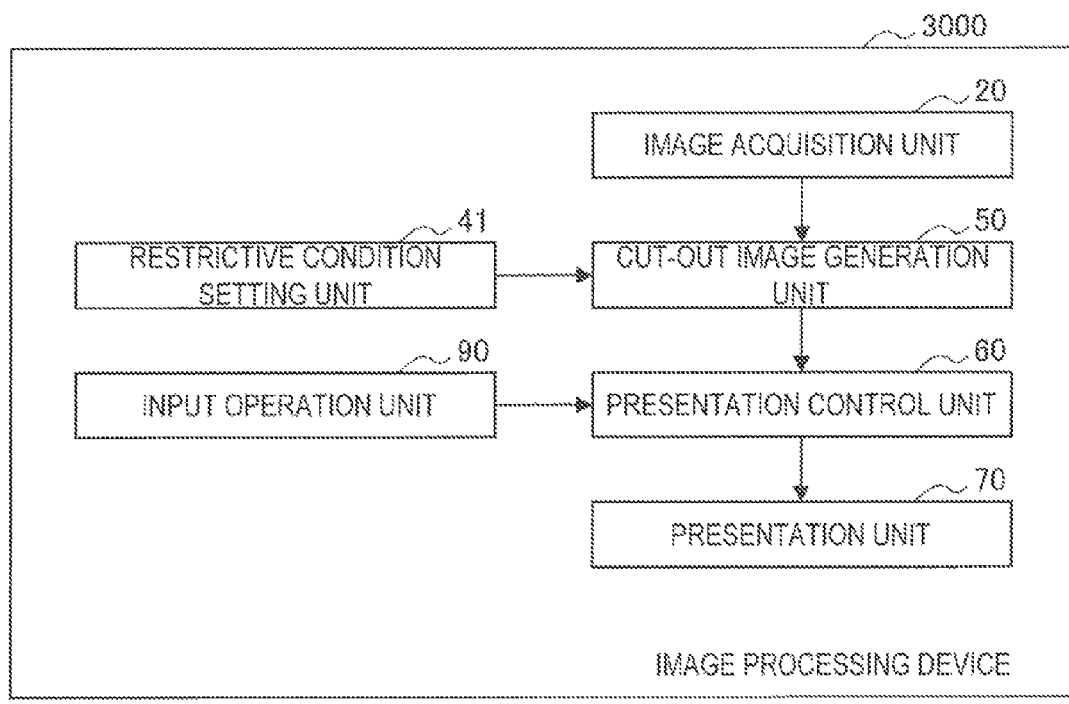
FIG. 37 is an illustrative diagram showing a configuration of an image processing device according to a second embodiment.

First, based on FIG. 37, a configuration of an image processing device 3000 according to the second embodiment will be described. The image processing device 3000 is provided with the image acquisition unit 20, a restrictive condition setting unit 41, the cut-out image generation unit 50, a presentation control unit 60, and the presentation unit 70. Note that the image processing device 3000 has hardware configurations such as a CPU, a ROM, a RAM, a display, a communication unit, and the like. On the ROM, programs for realizing the image acquisition unit 20, the restrictive condition setting unit 41, the cut-out image generation unit 50, the presentation control unit 60, and the presentation unit 70 in the image processing device 3000 are recorded.

The CPU reads and executes the programs recorded on the ROM. Thus, with the hardware configurations, the image acquisition unit 20, the restrictive condition setting unit 41, the cut-out image generation unit 50, the presentation control unit 60, and the presentation unit 70 are realized. In addition, the image processing device 3000 is a user terminal that a user uses. The second embodiment is preferably applied to, particularly, mobile terminals such as smartphones, and smart tablets. Since such mobile terminals have relatively small presentation units 70, enlarged input images are displayed in many cases. In the same manner as in the first embodiment, the image processing device 3000 may of course be a server connected to user terminals via a network. In addition, some functions of the image processing device 3000 may be provided in a server. Hereinafter, the second embodiment will be described exemplifying a case in which the image processing device 3000 is a mobile terminal.

The image acquisition unit 20, the cut-out image generation unit 50, and the presentation unit 70 are the same as those in the first embodiment. The restrictive condition setting unit 41 sets restrictive conditions from the same process as those of the effect image generation unit 40. The details of the restrictive conditions are the same as those in the first embodiment. The restrictive condition setting unit 41 generates restrictive condition information, and outputs the information to the cut-out image generation unit 50. The cut-out image generation unit 50 generates cut-out images based on the restrictive condition information. Then, the cut-out image generation unit 50 generates cut-out image information, and outputs the information to the presentation control unit 60.

The presentation control unit 60 displays various images based on the cut-out image information and input operation information. A specific process thereof will be described below. An input operation unit 90 is a so-called touch panel, which outputs the input operation information to the presentation control unit 60 according to input operations by a user.

Next, a specific example of the process executed by the presentation control unit 60 will be described. Note that, in this specific example, it is assumed that the image acquisition unit 20 acquires the input image 100*d* shown in FIG. 20, and the cut-out image generation unit 50 cuts the cut-out images 350 to 370 from the input image 100*d*.

First, the presentation control unit 60 displays the input image 100*d* on the presentation unit 70. Outer frames of the cut-out images 350 to 370 may be superimposed on this input image 100*d*. Then, a user taps desired cut-out images (for example, tapping twice). While generating an enlargement moving image in which the input image is enlarged, the presentation control unit 60 displays a moving image in which a part of the enlargement moving image, in other words, the cut-out images designated by the user, is zoomed on the presentation unit 70. This moving image ends when the heights of the cut-out images coincide with that of a display region of the presentation unit 70 (the portion of the presentation unit 70 in which the images are displayed), or the widths of the cut-out images coincide with the width of the display region of the presentation unit 70. Accordingly, the cut-out images designated by the user are enlarged and displayed. When the user designates the cut-out image 360, for example, the presentation control unit 60 displays the enlarged cut-out image 360 as shown in FIG. 25.

Then, the user performs a flicking operation in a desired direction. The presentation control unit 60 moves the input image 100*d* in the direction of the flicking operation while maintaining the zoom ratio of the input image 100*d*, and stops the movement when another cut-out image is presented. Accordingly, the user can easily view each cut-out image. When, for example, a flicking operation for the image shown in FIG. 25 moving in an inclined lower direction to the right side is detected during display, the presentation control unit 60 moves the cut-out image 360 in the inclined lower direction to the right side. Then, the presentation control unit 60 stops the movement when the cut-out image 370 is displayed as shown in FIG. 26.

Note that the presentation control unit 60 may display arrow images during display of enlarged cut-out images as in the example shown in FIG. 28. Accordingly, the user can easily recognize in which direction another cut-out image is present. In addition, when the user touches an arrow image, the presentation control unit 60 may display an enlarged cut-out image present in the direction of the arrow.

Figure 39:
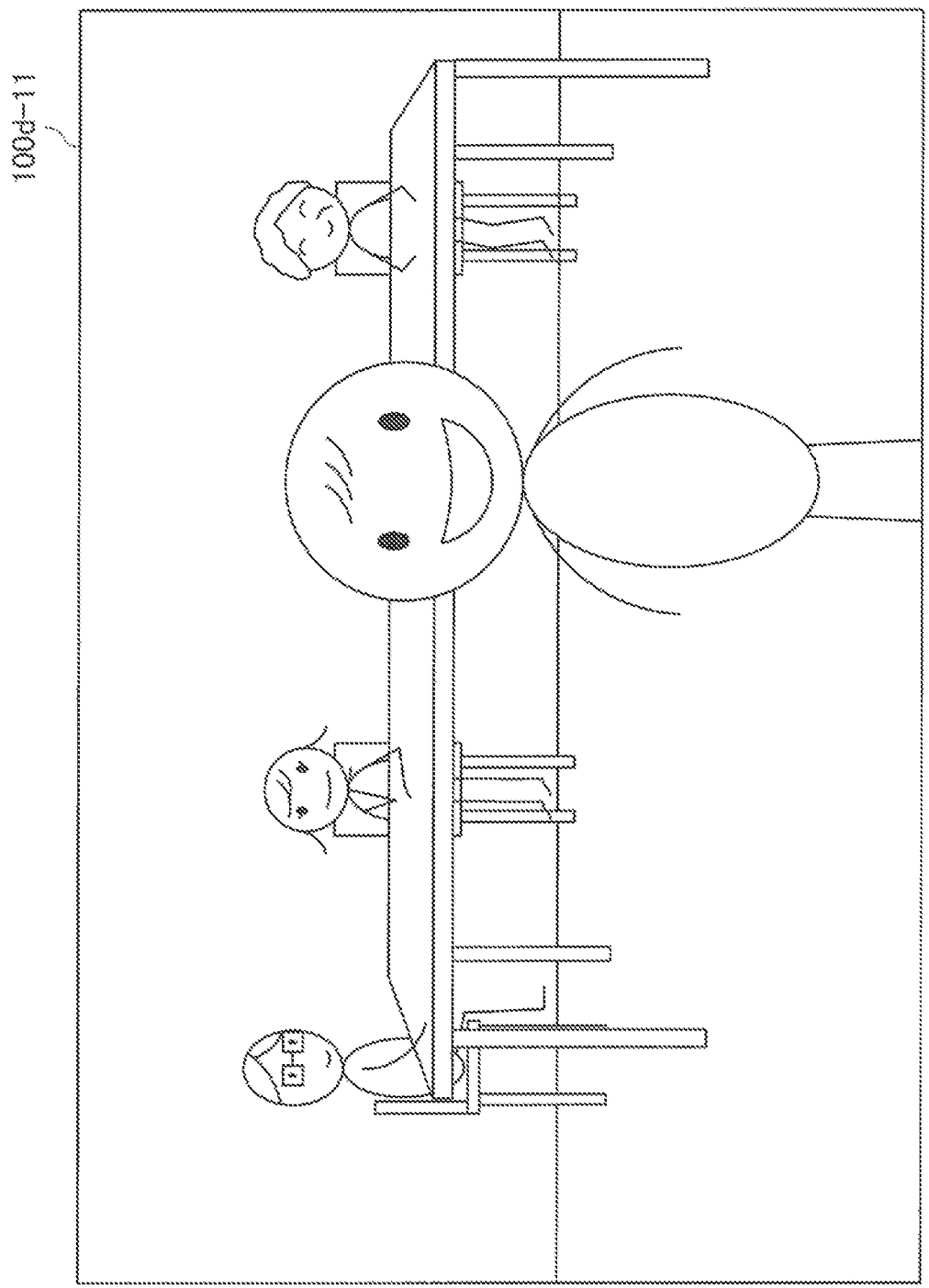
FIG. 39 is an illustrative diagram showing an effect image according to the related art.

On the other hand, as a technology for displaying an enlarged input image, a technology for displaying a moving image in which the center point of an input image is zoomed in on as shown in FIGS. 39 to 41 has been proposed. Input images 100*d*-11 to 100*d*-13 shown in FIGS. 39 to 41 are examples of images displayed in the middle of a moving image. In this technology, a user can search for a desired image by performing a flicking operation on displayed enlarged input images. However, in this technology, an enormous effort is necessary for a user to search for a desired image, for example, an image with a proper composition. On the other hand, the presentation control unit 60 of the second embodiment can display an image with a proper composition, that is, a cut-out image according to a simple operation by a user. Accordingly, the user can easily search for a desired image, for example, an image with a proper composition.

The second embodiment is particularly useful when an input image is extraordinarily large in comparison to the size of a display region (resolution) of the presentation unit 70, for example, when the input image is a pathological image in which the entire internal organs of a human body are taken. When the input image is an X-ray photograph in which all internal organs of a human body are photographed, the cut-out image generation unit 50 generates cut-out images by cutting portions in which internal organs of a human body are drawn from the input image. Then, the presentation control unit 60 displays each enlarged cut-out image according to an input operation by a user. Accordingly, the user can closely observe the states of the organs. When enlarged cut-out images are displayed, it is not easy for the user to know where other cut-out images are located. However, the user can observe other cut-out images by merely performing the above-described flicking operation or an operation of selecting an arrow.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, the cut-out image generation unit 50 may further generate another cut-out image (a cut-out image with a better composition, or the like) out of a cut-out image. In other words, the cut-out image generation unit 50 may generate cut-out images in stages. In addition, the first embodiment and the second embodiment may be combined.

For example, the same slide show as that in the first embodiment may be presented on the presentation unit 70 of the second embodiment.

Additionally, the present technology may also be configured as below.

(1) An image processing device including:

an image generation unit that analyzes an input image, cuts out, based on an analysis result of the input image, a cut-out image from the input image, and generates cut-out image information in which the cut-out image is associated with a restrictive condition that the cut-out image satisfies.

(2) The image processing device according to (1), wherein the image generation unit acquires restrictive condition information relating to the restrictive condition, and cuts out the cut-out image from the input image based on the analysis result of the input image and the restrictive condition information.

(3) The image processing device according to (1) or (2), wherein the image generation unit cuts out the cut-out image from the input image based on the analysis result of the input image, and sets, based on a parameter of the cut-out image, the restrictive condition that the cut-out image satisfies.

(4) The image processing device according to any one of (1) to (3), wherein the restrictive condition includes at least one of composition of the cut-out image, an aspect ratio of the cut-out image, a size of the cut-out image, a position of the cut-out image in the input image, a zoom ratio of the cut-out image with respect to the input image, a number of cut-out images, and presence or absence of overlap between cut-out images.

(5) The image processing device according to any one of (1) to (4), wherein the restrictive condition includes a condition in which the cut-out image is a moving image in which a subject included in the input image is zoomed in on.

(6) The image processing device according to (5), wherein the restrictive condition includes a condition in which the cut-out image is a moving image in which regions from a person image included in the input image to a subject in the direction of sight of the person image are sequentially displayed.

(7) An image processing method including:

cutting out, based on an analysis result of an input image, a cut-out image from the input image; and generating cut-out image information in which the cut-out image is associated with a restrictive condition that the cut-out image satisfies.

(8) A program for causing a computer to realize:

an image generation function of cutting out, based on an analysis result of an input image, a cut-out image from the input image, and generating cut-out image information in which the cut-out image is associated with a restrictive condition that the cut-out image satisfies.

The present disclosure contains subject matter related to that disclosed in Japanese Priority Patent Application JP 2012-128768 filed in the Japan Patent Office on Jun. 6, 2012, the entire content of which is hereby incorporated by reference.

What is claimed is:

1. An image processing device comprising:
at least one CPU configured to
receive an input image from a memory or a network that is external to the image processing device;
cut out a first cut-out image and a second cut-out image from the input image; and
provide effect image information relating to the first cut-out image and the second cut-out image to display an effect image to provide a slide show,
wherein the effect image simultaneously contains a first effect image and a second effect image corresponding to the first cut-out image and the second cut-out image respectively,
wherein the first effect image in a display plane is rotated with respect to the first cut-out image by a first rotation angle,
wherein the second effect image in the display plane is rotated with respect to the second cut-out image by a second rotation angle different from the first rotation angle, and
wherein the first cut-out image and the second cut-out image are different from each other.

2. The image processing device according to claim 1, wherein the at least one CPU is further configured to acquire restrictive condition information relating to a size of the first cut-out image, and cut out the first cut-out image and the second cut-out image from the input image based on the input image and the restrictive condition information.

3. The image processing device according to claim 1, wherein the at least one CPU is further configured to:
cut out the first cut-out image and the second cut-out image from the input image based on a first position of the first cut-out image and a second position of the second cut-out image respectively; and
set a first aspect ratio of the first cut-out image and a second aspect ratio of the second cut-out image based on ratios of respective display regions.

4. The image processing device according to claim 1, wherein the effect image information relates to display regions which are matched with the first and second cut-out images that have each been cut out from the input image.

5. The image processing device according to claim 4, wherein the first and second cut-out images are superimposed on the display regions.

6. The image processing device according to claim 1, wherein the CPU is further configured to generate a slide show information sequentially displaying the first cut-out image and the second cut-out image.

7. The image processing device according to claim 1, wherein the first cut-out image is configured to be a size at which the first cut-out image is not overlapped with the second cut-out image in the input image.

8. An image processing method executed by at least one CPU, the method comprising:
receiving, at an image processing device, an input image from a memory or a network that is external to the image processing device;
cutting out a first cut-out image and a second cut-out image from the input image; and
providing effect image information relating to the first cut-out image and the second cut-out image to display an effect image to provide a slide show,
wherein the effect image simultaneously contains a first effect image and a second effect image corresponding to the first cut-out image and the second cut-out image respectively,
wherein the first effect image in a display plane is rotated with respect to the first cut-out image by a first rotation angle,
wherein the second effect image in the display plane is rotated with respect to the second cut-out image by a second rotation angle different from the first rotation angle, and wherein the first cut-out image and the second cut-out image are different from each other.

9. The image processing method according to claim 8, wherein the first cut-out image is configured to be a size at which the first cut-out image is not overlapped with the second cut-out image in the input image.

10. A non-transitory computer-readable medium having embodied thereon a program, which when executed by a computer causes the computer to execute a method, the method comprising:

receiving, at an image processing device, an input image from a memory or a network that is external to the image processing device;

cutting out a first cut-out image and a second cut-out image from the input image; and providing effect image information relating to the first cut-out image and the second cut-out image to display an effect image to provide a slide show, wherein the effect image simultaneously contains a first effect image and a second effect image corresponding to the first cut-out image and the second cut-out image respectively, wherein the first effect image in a display plane is rotated with respect to the first cut-out image by a first rotation angle, wherein the second effect image in the display plane is rotated with respect to the second cut-out image by a second rotation angle different from the first rotation angle, and wherein the first cut-out image and the second cut-out image are different from each other.

11. The non-transitory computer-readable medium according to claim 10, wherein the first cut-out image is configured to be a size at which the first cut-out image is not overlapped with the second cut-out image in the input image.

* * * * *